(12) United States Patent
Ghosh et al.

(10) Patent No.: US 11,570,105 B2
(45) Date of Patent: Jan. 31, 2023

(54) DYNAMIC ROUTE PROFILE STORAGE IN A HARDWARE TRIE ROUTING TABLE

(71) Applicant: Cisco Technology, Inc., San Jose, CA (US)

(72) Inventors: Ankan Ghosh, San Jose, CA (US); Nataraj Bacthu, Sunnyvale, CA (US); Apurup Reddy Chevuru, Dublin, CA (US); Laxmi Kant Agrawal, San Jose, CA (US); Swaminathan Narayanan, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 97 days.

(21) Appl. No.: 17/244,936

(22) Filed: Apr. 29, 2021

(65) Prior Publication Data

US 2021/0250296 A1 Aug. 12, 2021

Related U.S. Application Data

(63) Continuation of application No. 16/557,298, filed on Aug. 30, 2019, now Pat. No. 10,999,199, which is a (Continued)

(51) Int. Cl.
*H04L 45/7453* (2022.01)
*G06F 3/06* (2006.01)
*H04L 45/00* (2022.01)

(52) U.S. Cl.
CPC .......... *H04L 45/7453* (2013.01); *G06F 3/061* (2013.01); *G06F 3/0638* (2013.01); *G06F 3/0673* (2013.01); *H04L 45/00* (2013.01)

(58) Field of Classification Search
CPC ..... H04L 45/7453; H04L 45/00; G06F 3/061; G06F 3/0638; G06F 3/0673
See application file for complete search history.

(56) References Cited

U.S. PATENT DOCUMENTS 4,688,695 A 8/1987 Hirohata
5,263,003 A 11/1993 Cowles et al.
(Continued)

FOREIGN PATENT DOCUMENTS

EP 2228719 9/2010
EP 2439637 4/2012
(Continued)

OTHER PUBLICATIONS

Author Unknown, "5 Benefits of a Storage Gateway in the Cloud," Blog, TwinStrata, Inc., posted Jul. 10, 2012, 4 pages, https://web.archive.org/web/20120725092619/http://blog.twinstrata.com/2012/07/10//5-benefits-of-a-storage-gateway-in-the-cloud.
(Continued)

*Primary Examiner* — Kashif Siddiqui
(74) *Attorney, Agent, or Firm* — Polsinelli

(57) ABSTRACT

The present disclosure involves systems and methods for managing a trie routing table for a networking device of a communication or computer network. In one implementation, the networking device may utilize a dynamic algorithm for associating hashing functions with pivot tiles of the routing table to improve hash utilization and avoid hash collisions. Further, route prefixes may be relocated from pivot tiles in an attempt to free the tiles for reallocation to other prefix base width or may be relocated to other possible pivot tiles or to a general storage space when a hash collision is detected. This provides for even distribution of pivots within tiles which have base widths in range of a pivot route. The above implementations may occur together or separately to improve the operation of the networking device and provide faster route lookup.

20 Claims, 11 Drawing Sheets

Related U.S. Application Data continuation of application No. 15/723,713, filed on Oct. 3, 2017, now Pat. No. 10,404,596.

(56) References Cited

U.S. PATENT DOCUMENTS

| | | |
|---|---|---|
| 5,339,445 A | 8/1994 | Gasztonyi |
| 5,430,859 A | 7/1995 | Norman et al. |
| 5,457,746 A | 10/1995 | Dolphin |
| 5,535,336 A | 7/1996 | Smith et al. |
| 5,588,012 A | 12/1996 | Oizumi |
| 5,617,421 A | 4/1997 | Chin et al. |
| 5,680,579 A | 10/1997 | Young et al. |
| 5,690,194 A | 11/1997 | Parker et al. |
| 5,740,171 A | 4/1998 | Mazzola et al. |
| 5,742,604 A | 4/1998 | Edsall et al. |
| 5,764,636 A | 6/1998 | Edsall |
| 5,809,285 A | 9/1998 | Hilland |
| 5,812,814 A | 9/1998 | Sukegawa |
| 5,812,950 A | 9/1998 | Tom |
| 5,838,970 A | 11/1998 | Thomas |
| 5,999,930 A | 12/1999 | Wolff |
| 6,035,105 A | 3/2000 | McCloghrie et al. |
| 6,043,777 A | 3/2000 | Bergman et al. |
| 6,101,497 A | 8/2000 | Ofek |
| 6,148,414 A | 11/2000 | Brown et al. |
| 6,185,203 B1 | 2/2001 | Berman |
| 6,188,694 B1 | 2/2001 | Fine et al. |
| 6,202,135 B1 | 3/2001 | Kedem et al. |
| 6,208,649 B1 | 3/2001 | Kloth |
| 6,209,059 B1 | 3/2001 | Ofer et al. |
| 6,219,699 B1 | 4/2001 | McCloghrie et al. |
| 6,219,753 B1 | 4/2001 | Richardson |
| 6,223,250 B1 | 4/2001 | Yokono |
| 6,226,771 B1 | 5/2001 | Hilla et al. |
| 6,260,120 B1 | 7/2001 | Blumenau et al. |
| 6,266,705 B1 | 7/2001 | Ullum et al. |
| 6,269,381 B1 | 7/2001 | St. Pierre et al. |
| 6,269,431 B1 | 7/2001 | Dunham |
| 6,295,575 B1 | 9/2001 | Blumenau et al. |
| 6,400,730 B1 | 6/2002 | Latif et al. |
| 6,408,406 B1 | 6/2002 | Parris |
| 6,542,909 B1 | 4/2003 | Tamer et al. |
| 6,542,961 B1 | 4/2003 | Matsunami et al. |
| 6,553,390 B1 | 4/2003 | Gross et al. |
| 6,564,252 B1 | 5/2003 | Hickman et al. |
| 6,647,474 B2 | 11/2003 | Yanai et al. |
| 6,675,258 B1 | 1/2004 | Bramhall et al. |
| 6,683,883 B1 | 1/2004 | Czeiger et al. |
| 6,694,413 B1 | 2/2004 | Mimatsu et al. |
| 6,708,227 B1 | 3/2004 | Cabrera et al. |
| 6,715,007 B1 | 3/2004 | Williams et al. |
| 6,728,791 B1 | 4/2004 | Young |
| 6,772,231 B2 | 8/2004 | Reuter et al. |
| 6,820,099 B1 | 11/2004 | Huber et al. |
| 6,847,647 B1 | 1/2005 | Wrenn |
| 6,848,759 B2 | 2/2005 | Doornbos et al. |
| 6,850,955 B2 | 2/2005 | Sonoda et al. |
| 6,876,656 B2 | 4/2005 | Brewer et al. |
| 6,880,062 B1 | 4/2005 | Ibrahim et al. |
| 6,898,670 B2 | 5/2005 | Nahum |
| 6,907,419 B1 | 6/2005 | Pesola et al. |
| 6,912,668 B1 | 6/2005 | Brown et al. |
| 6,952,734 B1 | 10/2005 | Gunlock et al. |
| 6,976,090 B2 | 12/2005 | Ben-Shaul et al. |
| 6,978,300 B1 | 12/2005 | Beukema et al. |
| 6,983,303 B2 | 1/2006 | Pellegrino et al. |
| 6,986,015 B2 | 1/2006 | Testardi |
| 6,986,069 B2 | 1/2006 | Oehler et al. |
| 7,051,056 B2 | 5/2006 | Rodriguez-Rivera et al. |
| 7,069,465 B2 | 6/2006 | Chu et al. |
| 7,073,017 B2 | 7/2006 | Yamamoto |
| 7,108,339 B2 | 9/2006 | Berger |
| 7,149,858 B1 | 12/2006 | Kiselev |
| 7,171,514 B2 | 1/2007 | Coronado et al. |
| 7,171,668 B2 | 1/2007 | Molloy et al. |
| 7,174,354 B2 | 2/2007 | Andreasson |
| 7,200,144 B2 | 4/2007 | Terrell et al. |
| 7,222,255 B1 | 5/2007 | Claessens et al. |
| 7,237,045 B2 | 6/2007 | Beckmann et al. |
| 7,240,188 B2 | 7/2007 | Takata et al. |
| 7,246,260 B2 | 7/2007 | Brown et al. |
| 7,266,718 B2 | 9/2007 | Idel et al. |
| 7,269,168 B2 | 9/2007 | Roy et al. |
| 7,277,431 B2 | 10/2007 | Walter et al. |
| 7,277,948 B2 | 10/2007 | Igarashi et al. |
| 7,305,658 B1 | 12/2007 | Hamilton et al. |
| 7,328,434 B2 | 2/2008 | Swanson et al. |
| 7,340,555 B2 | 3/2008 | Ashmore et al. |
| 7,346,751 B2 | 3/2008 | Prahlad et al. |
| 7,352,706 B2 | 4/2008 | Klotz et al. |
| 7,353,305 B2 | 4/2008 | Pangal et al. |
| 7,359,321 B1 | 4/2008 | Sindhu et al. |
| 7,383,381 B1 | 6/2008 | Faulkner et al. |
| 7,403,987 B1 | 7/2008 | Marinelli et al. |
| 7,433,326 B2 | 10/2008 | Desai et al. |
| 7,433,948 B2 | 10/2008 | Edsall |
| 7,434,105 B1 | 10/2008 | Rodriguez-Rivera et al. |
| 7,441,154 B2 | 10/2008 | Klotz et al. |
| 7,447,839 B2 | 11/2008 | Uppala |
| 7,487,321 B2 | 2/2009 | Muthiah et al. |
| 7,500,053 B1 | 3/2009 | Kavuri et al. |
| 7,512,744 B2 | 3/2009 | Banga et al. |
| 7,542,681 B2 | 6/2009 | Cornell et al. |
| 7,558,872 B1 | 7/2009 | Senevirathne et al. |
| 7,587,570 B2 | 9/2009 | Sarkar et al. |
| 7,631,023 B1 | 12/2009 | Kaiser et al. |
| 7,643,505 B1 | 1/2010 | Colloff |
| 7,654,625 B2 | 2/2010 | Amann et al. |
| 7,657,796 B1 | 2/2010 | Kaiser et al. |
| 7,668,981 B1 | 2/2010 | Nagineni et al. |
| 7,669,071 B2 | 2/2010 | Cochran et al. |
| 7,689,384 B1 | 3/2010 | Becker |
| 7,694,092 B2 | 4/2010 | Mizuno |
| 7,697,554 B1 | 4/2010 | Ofer et al. |
| 7,706,303 B2 | 4/2010 | Bose et al. |
| 7,707,481 B2 | 4/2010 | Kirschner et al. |
| 7,716,648 B2 | 5/2010 | Vaidyanathan et al. |
| 7,752,360 B2 | 7/2010 | Galles |
| 7,757,059 B1 | 7/2010 | Ofer et al. |
| 7,774,329 B1 | 8/2010 | Peddy et al. |
| 7,774,839 B2 | 8/2010 | Nazzal |
| 7,793,138 B2 | 9/2010 | Rastogi et al. |
| 7,840,730 B2 | 11/2010 | D'Amato et al. |
| 7,843,906 B1 | 11/2010 | Chidambaram et al. |
| 7,895,428 B2 | 2/2011 | Boland, IV et al. |
| 7,904,599 B1 | 3/2011 | Bennett |
| 7,930,494 B1 | 4/2011 | Goheer et al. |
| 7,975,175 B2 | 7/2011 | Votta et al. |
| 7,979,670 B2 | 7/2011 | Saliba et al. |
| 7,984,259 B1 | 7/2011 | English |
| 8,031,703 B2 | 10/2011 | Gottumukkula et al. |
| 8,032,621 B1 | 10/2011 | Upalekar et al. |
| 8,051,197 B2 | 11/2011 | Mullendore et al. |
| 8,086,755 B2 | 12/2011 | Duffy, IV et al. |
| 8,161,134 B2 | 4/2012 | Mishra et al. |
| 8,196,018 B2 | 6/2012 | Forhan et al. |
| 8,205,951 B2 | 6/2012 | Boks |
| 8,218,538 B1 | 7/2012 | Chidambaram et al. |
| 8,230,066 B2 | 7/2012 | Heil |
| 8,234,377 B2 | 7/2012 | Cohn |
| 8,266,238 B2 | 9/2012 | Zimmer et al. |
| 8,272,104 B2 | 9/2012 | Chen et al. |
| 8,274,993 B2 | 9/2012 | Sharma et al. |
| 8,290,919 B1 | 10/2012 | Kelly et al. |
| 8,297,722 B2 | 10/2012 | Chambers et al. |
| 8,301,746 B2 | 10/2012 | Head et al. |
| 8,335,231 B2 | 12/2012 | Kloth et al. |
| 8,341,121 B1 | 12/2012 | Claudatos et al. |
| 8,345,692 B2 | 1/2013 | Smith |
| 8,352,941 B1 | 1/2013 | Protopopov et al. |
| 8,392,760 B2 | 3/2013 | Kandula et al. |
| 8,442,059 B1 | 5/2013 | de la Iglesia et al. |
| 8,479,211 B1 | 7/2013 | Marshall et al. |
| 8,495,356 B2 | 7/2013 | Ashok et al. |

(56) References Cited

U.S. PATENT DOCUMENTS

| | | |
|---|---|---|
| 8,514,868 B2 | 8/2013 | Hill |
| 8,532,108 B2 | 9/2013 | Li et al. |
| 8,560,663 B2 | 10/2013 | Baucke et al. |
| 8,619,599 B1 | 12/2013 | Even |
| 8,626,891 B2 | 1/2014 | Guru et al. |
| 8,630,983 B2 | 1/2014 | Sengupta et al. |
| 8,660,129 B1 | 2/2014 | Brendel et al. |
| 8,661,299 B1 | 2/2014 | Ip |
| 8,677,485 B2 | 3/2014 | Sharma et al. |
| 8,683,296 B2 | 3/2014 | Anderson et al. |
| 8,706,772 B2 | 4/2014 | Hartig et al. |
| 8,719,804 B2 | 5/2014 | Jain |
| 8,725,854 B2 | 5/2014 | Edsall |
| 8,768,981 B1 | 7/2014 | Milne et al. |
| 8,775,773 B2 | 7/2014 | Acharya et al. |
| 8,793,372 B2 | 7/2014 | Ashok et al. |
| 8,805,918 B1 | 8/2014 | Chandrasekaran et al. |
| 8,805,951 B1 | 8/2014 | Faibish et al. |
| 8,832,330 B1 | 9/2014 | Lancaster |
| 8,855,116 B2 | 10/2014 | Rosset et al. |
| 8,856,339 B2 | 10/2014 | Mestery et al. |
| 8,868,474 B2 | 10/2014 | Leung et al. |
| 8,887,286 B2 | 11/2014 | Dupont et al. |
| 8,898,385 B2 | 11/2014 | Jayaraman et al. |
| 8,909,928 B2 | 12/2014 | Ahmad et al. |
| 8,918,510 B2 | 12/2014 | Gmach et al. |
| 8,918,586 B1 | 12/2014 | Todd et al. |
| 8,924,720 B2 | 12/2014 | Raghuram et al. |
| 8,930,747 B2 | 1/2015 | Levijarvi et al. |
| 8,935,500 B1 | 1/2015 | Gulati et al. |
| 8,949,677 B1 | 2/2015 | Brundage et al. |
| 8,996,837 B1 | 3/2015 | Bono et al. |
| 9,003,086 B1 | 4/2015 | Schuller et al. |
| 9,007,922 B1 | 4/2015 | Mittal et al. |
| 9,009,427 B2 | 4/2015 | Sharma et al. |
| 9,009,704 B2 | 4/2015 | McGrath et al. |
| 9,075,638 B2 | 7/2015 | Barnett et al. |
| 9,141,554 B1 | 9/2015 | Candelaria |
| 9,141,785 B2 | 9/2015 | Mukkara et al. |
| 9,164,795 B1 | 10/2015 | Vincent |
| 9,176,677 B1 | 11/2015 | Fradkin et al. |
| 9,201,704 B2 | 12/2015 | Chang et al. |
| 9,203,784 B2 | 12/2015 | Chang et al. |
| 9,207,882 B2 | 12/2015 | Rosset et al. |
| 9,207,929 B2 | 12/2015 | Katsura |
| 9,213,612 B2 | 12/2015 | Candelaria |
| 9,223,564 B2 | 12/2015 | Munireddy et al. |
| 9,223,634 B2 | 12/2015 | Chang et al. |
| 9,244,761 B2 | 1/2016 | Yekhanin et al. |
| 9,250,969 B2 | 2/2016 | Lager-Cavilla et al. |
| 9,264,494 B2 | 2/2016 | Factor et al. |
| 9,270,754 B2 | 2/2016 | Iyengar et al. |
| 9,280,487 B2 | 3/2016 | Candelaria |
| 9,304,815 B1 | 4/2016 | Vasanth et al. |
| 9,313,048 B2 | 4/2016 | Chang et al. |
| 9,374,270 B2 | 6/2016 | Nakil et al. |
| 9,378,060 B2 | 6/2016 | Jansson et al. |
| 9,396,251 B1 | 7/2016 | Boudreau et al. |
| 9,448,877 B2 | 9/2016 | Candelaria |
| 9,471,348 B2 | 10/2016 | Zuo et al. |
| 9,501,473 B1 | 11/2016 | Kong et al. |
| 9,503,523 B2 | 11/2016 | Rosset et al. |
| 9,565,110 B2 | 2/2017 | Mullendore et al. |
| 9,575,828 B2 | 2/2017 | Agarwal et al. |
| 9,582,377 B1 | 2/2017 | Dhoolam et al. |
| 9,614,763 B2 | 4/2017 | Dong et al. |
| 9,658,868 B2 | 5/2017 | Hill |
| 9,658,876 B2 | 5/2017 | Chang et al. |
| 9,729,669 B2 * | 8/2017 | Varvello .................. H04L 67/63 |
| 9,733,868 B2 | 8/2017 | Chandrasekaran et al. |
| 9,763,518 B2 | 9/2017 | Charest et al. |
| 9,830,240 B2 | 11/2017 | George et al. |
| 9,853,873 B2 | 12/2017 | Dasu et al. |
| 9,979,648 B1 * | 5/2018 | Singh .................. H04L 45/7453 |
| 9,985,885 B1 * | 5/2018 | Singh .................. H04L 45/741 |
| 10,404,596 B2 * | 9/2019 | Ghosh .................. G06F 3/0638 |
| 2002/0049980 A1 | 4/2002 | Hoang |
| 2002/0053009 A1 | 5/2002 | Selkirk et al. |
| 2002/0073276 A1 | 6/2002 | Howard et al. |
| 2002/0083120 A1 | 6/2002 | Soltis |
| 2002/0095547 A1 | 7/2002 | Watanabe et al. |
| 2002/0103889 A1 | 8/2002 | Markson et al. |
| 2002/0103943 A1 | 8/2002 | Lo et al. |
| 2002/0112113 A1 | 8/2002 | Karpoff et al. |
| 2002/0120741 A1 | 8/2002 | Webb et al. |
| 2002/0138675 A1 | 9/2002 | Mann |
| 2002/0156971 A1 | 10/2002 | Jones et al. |
| 2003/0023885 A1 | 1/2003 | Potter et al. |
| 2003/0026267 A1 | 2/2003 | Oberman et al. |
| 2003/0055933 A1 | 3/2003 | Ishizaki et al. |
| 2003/0056126 A1 | 3/2003 | O'Connor et al. |
| 2003/0065986 A1 | 4/2003 | Fraenkel et al. |
| 2003/0084359 A1 | 5/2003 | Bresniker et al. |
| 2003/0118053 A1 | 6/2003 | Edsall et al. |
| 2003/0131105 A1 | 7/2003 | Czeiger et al. |
| 2003/0131165 A1 | 7/2003 | Asano et al. |
| 2003/0131182 A1 | 7/2003 | Kumar et al. |
| 2003/0140134 A1 | 7/2003 | Swanson et al. |
| 2003/0140210 A1 | 7/2003 | Testardi |
| 2003/0149763 A1 | 8/2003 | Heitman et al. |
| 2003/0154271 A1 | 8/2003 | Baldwin et al. |
| 2003/0159058 A1 | 8/2003 | Eguchi et al. |
| 2003/0174725 A1 | 9/2003 | Shankar |
| 2003/0189395 A1 | 10/2003 | Doornbos et al. |
| 2003/0210686 A1 | 11/2003 | Terrell et al. |
| 2004/0024961 A1 | 2/2004 | Cochran et al. |
| 2004/0030857 A1 | 2/2004 | Krakirian et al. |
| 2004/0039939 A1 | 2/2004 | Cox et al. |
| 2004/0054776 A1 | 3/2004 | Klotz et al. |
| 2004/0057389 A1 | 3/2004 | Klotz et al. |
| 2004/0059807 A1 | 3/2004 | Klotz et al. |
| 2004/0088574 A1 | 5/2004 | Walter et al. |
| 2004/0117438 A1 | 6/2004 | Considine et al. |
| 2004/0123029 A1 | 6/2004 | Dalai et al. |
| 2004/0128470 A1 | 7/2004 | Hetzler et al. |
| 2004/0128540 A1 | 7/2004 | Roskind |
| 2004/0153863 A1 | 8/2004 | Klotz et al. |
| 2004/0190901 A1 | 9/2004 | Fang |
| 2004/0215749 A1 | 10/2004 | Tsao |
| 2004/0230848 A1 | 11/2004 | Mayo et al. |
| 2004/0250034 A1 | 12/2004 | Yagawa et al. |
| 2005/0033936 A1 | 2/2005 | Nakano et al. |
| 2005/0036499 A1 | 2/2005 | Dutt et al. |
| 2005/0050211 A1 | 3/2005 | Kaul et al. |
| 2005/0050270 A1 | 3/2005 | Horn et al. |
| 2005/0053073 A1 | 3/2005 | Kloth et al. |
| 2005/0055428 A1 | 3/2005 | Terai et al. |
| 2005/0060574 A1 | 3/2005 | Klotz et al. |
| 2005/0060598 A1 | 3/2005 | Klotz et al. |
| 2005/0071851 A1 | 3/2005 | Opheim |
| 2005/0076113 A1 | 4/2005 | Klotz et al. |
| 2005/0091426 A1 | 4/2005 | Horn et al. |
| 2005/0114611 A1 | 5/2005 | Durham et al. |
| 2005/0114615 A1 | 5/2005 | Ogasawara et al. |
| 2005/0117522 A1 | 6/2005 | Basavaiah et al. |
| 2005/0117562 A1 | 6/2005 | Wrenn |
| 2005/0138287 A1 | 6/2005 | Ogasawara et al. |
| 2005/0169188 A1 | 8/2005 | Cometto et al. |
| 2005/0185597 A1 | 8/2005 | Le et al. |
| 2005/0188170 A1 | 8/2005 | Yamamoto |
| 2005/0198523 A1 | 9/2005 | Shanbhag et al. |
| 2005/0235072 A1 | 10/2005 | Smith et al. |
| 2005/0283658 A1 | 12/2005 | Clark et al. |
| 2006/0015861 A1 | 1/2006 | Takata et al. |
| 2006/0015928 A1 | 1/2006 | Setty et al. |
| 2006/0034302 A1 | 2/2006 | Peterson |
| 2006/0045021 A1 | 3/2006 | Deragon et al. |
| 2006/0075191 A1 | 4/2006 | Lolayekar et al. |
| 2006/0098672 A1 | 5/2006 | Schzukin et al. |
| 2006/0117099 A1 | 6/2006 | Mogul |
| 2006/0136684 A1 | 6/2006 | Le et al. |
| 2006/0184287 A1 | 8/2006 | Belady et al. |
| 2006/0198319 A1 | 9/2006 | Schondelmayer et al. |
| 2006/0215297 A1 | 9/2006 | Kikuchi |

(56) References Cited

U.S. PATENT DOCUMENTS

| | | |
|---|---|---|
| 2006/0230227 A1 | 10/2006 | Ogasawara et al. |
| 2006/0242332 A1 | 10/2006 | Johnsen et al. |
| 2006/0251111 A1 | 11/2006 | Kloth et al. |
| 2007/0005297 A1 | 1/2007 | Beresniewicz et al. |
| 2007/0067593 A1 | 3/2007 | Satoyama et al. |
| 2007/0079068 A1 | 4/2007 | Draggon |
| 2007/0091903 A1 | 4/2007 | Atkinson |
| 2007/0094465 A1 | 4/2007 | Sharma et al. |
| 2007/0101202 A1 | 5/2007 | Garbow |
| 2007/0121519 A1 | 5/2007 | Cuni et al. |
| 2007/0136541 A1 | 6/2007 | Herz et al. |
| 2007/0162969 A1 | 7/2007 | Becker |
| 2007/0211640 A1 | 9/2007 | Palacharla et al. |
| 2007/0214316 A1 | 9/2007 | Kim |
| 2007/0250838 A1 | 10/2007 | Belady et al. |
| 2007/0258380 A1 | 11/2007 | Chamdani et al. |
| 2007/0263545 A1 | 11/2007 | Foster et al. |
| 2007/0276884 A1 | 11/2007 | Hara et al. |
| 2007/0283059 A1 | 12/2007 | Ho et al. |
| 2008/0016412 A1 | 1/2008 | White et al. |
| 2008/0034149 A1 | 2/2008 | Sheen |
| 2008/0052459 A1 | 2/2008 | Chang et al. |
| 2008/0059698 A1 | 3/2008 | Kabir et al. |
| 2008/0114933 A1 | 5/2008 | Ogasawara et al. |
| 2008/0126509 A1 | 5/2008 | Subrannanian et al. |
| 2008/0126734 A1 | 5/2008 | Murase |
| 2008/0168304 A1 | 7/2008 | Flynn et al. |
| 2008/0201616 A1 | 8/2008 | Ashmore |
| 2008/0244184 A1 | 10/2008 | Lewis et al. |
| 2008/0256082 A1 | 10/2008 | Davies et al. |
| 2008/0267217 A1 | 10/2008 | Colville et al. |
| 2008/0288661 A1 | 11/2008 | Galles |
| 2008/0294888 A1 | 11/2008 | Ando et al. |
| 2009/0063766 A1 | 3/2009 | Matsumura et al. |
| 2009/0083484 A1 | 3/2009 | Basham et al. |
| 2009/0089567 A1 | 4/2009 | Boland, IV et al. |
| 2009/0094380 A1 | 4/2009 | Qiu et al. |
| 2009/0094664 A1 | 4/2009 | Butler et al. |
| 2009/0125694 A1 | 5/2009 | Innan et al. |
| 2009/0193223 A1 | 7/2009 | Saliba et al. |
| 2009/0201926 A1 | 8/2009 | Kagan et al. |
| 2009/0222733 A1 | 9/2009 | Basham et al. |
| 2009/0240873 A1 | 9/2009 | Yu et al. |
| 2009/0282471 A1 | 11/2009 | Green et al. |
| 2009/0323706 A1 | 12/2009 | Germain et al. |
| 2010/0011365 A1 | 1/2010 | Gerovac et al. |
| 2010/0030995 A1 | 2/2010 | Wang et al. |
| 2010/0046378 A1 | 2/2010 | Knapp et al. |
| 2010/0083055 A1 | 4/2010 | Ozonat |
| 2010/0174968 A1 | 7/2010 | Charles et al. |
| 2010/0318609 A1 | 12/2010 | Lahiri et al. |
| 2010/0318837 A1 | 12/2010 | Murphy et al. |
| 2011/0010394 A1 | 1/2011 | Carew et al. |
| 2011/0022691 A1 | 1/2011 | Banerjee et al. |
| 2011/0029824 A1 | 2/2011 | Schöler et al. |
| 2011/0035494 A1 | 2/2011 | Pandey et al. |
| 2011/0075667 A1 | 3/2011 | Li et al. |
| 2011/0087848 A1 | 4/2011 | Trent |
| 2011/0119556 A1 | 5/2011 | de Buen |
| 2011/0142053 A1 | 6/2011 | Van Der Merwe et al. |
| 2011/0161496 A1 | 6/2011 | Nicklin |
| 2011/0173303 A1 | 7/2011 | Rider |
| 2011/0228679 A1 | 9/2011 | Varma et al. |
| 2011/0231899 A1 | 9/2011 | Pulier et al. |
| 2011/0239039 A1 | 9/2011 | Dieffenbach et al. |
| 2011/0252274 A1 | 10/2011 | Kawaguchi et al. |
| 2011/0255540 A1 | 10/2011 | Mizrahi et al. |
| 2011/0276584 A1 | 11/2011 | Cotner et al. |
| 2011/0276675 A1 | 11/2011 | Singh et al. |
| 2011/0276951 A1 | 11/2011 | Jain |
| 2011/0299539 A1 | 12/2011 | Rajagopal et al. |
| 2011/0307450 A1 | 12/2011 | Hahn et al. |
| 2011/0313973 A1 | 12/2011 | Srivas et al. |
| 2012/0023319 A1 | 1/2012 | Chin et al. |
| 2012/0030401 A1 | 2/2012 | Cowan et al. |
| 2012/0054367 A1 | 3/2012 | Ramakrishnan et al. |
| 2012/0072578 A1 | 3/2012 | Alam |
| 2012/0072985 A1 | 3/2012 | Davne et al. |
| 2012/0075999 A1 | 3/2012 | Ko et al. |
| 2012/0084445 A1 | 4/2012 | Brock et al. |
| 2012/0084782 A1 | 4/2012 | Chou et al. |
| 2012/0096134 A1 | 4/2012 | Suit |
| 2012/0130874 A1 | 5/2012 | Mane et al. |
| 2012/0131174 A1 | 5/2012 | Ferris et al. |
| 2012/0134672 A1 | 5/2012 | Banerjee |
| 2012/0144014 A1 | 6/2012 | Natham et al. |
| 2012/0159112 A1 | 6/2012 | Tokusho et al. |
| 2012/0167094 A1 | 6/2012 | Suit |
| 2012/0173581 A1 | 7/2012 | Hartig et al. |
| 2012/0173589 A1 | 7/2012 | Kwon et al. |
| 2012/0177039 A1 | 7/2012 | Berman |
| 2012/0177041 A1 | 7/2012 | Berman |
| 2012/0177042 A1 | 7/2012 | Berman |
| 2012/0177043 A1 | 7/2012 | Berman |
| 2012/0177044 A1 | 7/2012 | Berman |
| 2012/0177045 A1 | 7/2012 | Berman |
| 2012/0177370 A1 | 7/2012 | Berman |
| 2012/0179909 A1 | 7/2012 | Sagi et al. |
| 2012/0201138 A1 | 8/2012 | Yu et al. |
| 2012/0210041 A1 | 8/2012 | Flynn et al. |
| 2012/0254440 A1 | 10/2012 | Wang |
| 2012/0257501 A1 | 10/2012 | Kucharczyk |
| 2012/0265976 A1 | 10/2012 | Spiers et al. |
| 2012/0281706 A1 | 11/2012 | Agarwal et al. |
| 2012/0297088 A1 | 11/2012 | Wang et al. |
| 2012/0303618 A1 | 11/2012 | Dutta et al. |
| 2012/0311106 A1 | 12/2012 | Morgan |
| 2012/0311568 A1 | 12/2012 | Jansen |
| 2012/0320788 A1 | 12/2012 | Venkataramanan et al. |
| 2012/0324114 A1 | 12/2012 | Dutta et al. |
| 2012/0331119 A1 | 12/2012 | Bose et al. |
| 2013/0003737 A1 | 1/2013 | Sinicrope |
| 2013/0013664 A1 | 1/2013 | Baird et al. |
| 2013/0028135 A1 | 1/2013 | Berman |
| 2013/0036212 A1 | 2/2013 | Jibbe et al. |
| 2013/0036213 A1 | 2/2013 | Hasan et al. |
| 2013/0036449 A1 | 2/2013 | Mukkara et al. |
| 2013/0054888 A1 | 2/2013 | Bhat et al. |
| 2013/0061089 A1 | 3/2013 | Valiyaparambil et al. |
| 2013/0067162 A1 | 3/2013 | Jayaraman et al. |
| 2013/0080823 A1 | 3/2013 | Roth et al. |
| 2013/0086340 A1 | 4/2013 | Fleming et al. |
| 2013/0100858 A1 | 4/2013 | Kamath et al. |
| 2013/0111540 A1 | 5/2013 | Sabin |
| 2013/0138816 A1 | 5/2013 | Kuo et al. |
| 2013/0138836 A1 | 5/2013 | Cohen et al. |
| 2013/0139138 A1 | 5/2013 | Kakos |
| 2013/0144933 A1 | 6/2013 | Hinni et al. |
| 2013/0152076 A1 | 6/2013 | Patel |
| 2013/0152175 A1 | 6/2013 | Hromoko et al. |
| 2013/0163426 A1 | 6/2013 | Beliveau et al. |
| 2013/0163606 A1 | 6/2013 | Bagepalli et al. |
| 2013/0179941 A1 | 7/2013 | McGloin et al. |
| 2013/0182712 A1 | 7/2013 | Aguayo et al. |
| 2013/0185433 A1 | 7/2013 | Zhu et al. |
| 2013/0191106 A1 | 7/2013 | Kephart et al. |
| 2013/0198730 A1 | 8/2013 | Munireddy et al. |
| 2013/0208888 A1 | 8/2013 | Agrawal et al. |
| 2013/0212130 A1 | 8/2013 | Rahnama |
| 2013/0223236 A1 | 8/2013 | Dickey |
| 2013/0238641 A1 | 9/2013 | Mandelstein et al. |
| 2013/0266307 A1 | 10/2013 | Garg et al. |
| 2013/0268922 A1 | 10/2013 | Tiwari et al. |
| 2013/0275470 A1 | 10/2013 | Cao et al. |
| 2013/0297655 A1 | 11/2013 | Narasayya et al. |
| 2013/0297769 A1 | 11/2013 | Chang et al. |
| 2013/0318134 A1 | 11/2013 | Bolik et al. |
| 2013/0318288 A1 | 11/2013 | Khan et al. |
| 2014/0006708 A1 | 1/2014 | Huynh et al. |
| 2014/0016493 A1 | 1/2014 | Johnsson et al. |
| 2014/0019684 A1 | 1/2014 | Wei et al. |
| 2014/0025770 A1 | 1/2014 | Warfield et al. |
| 2014/0029441 A1 | 1/2014 | Nydell |
| 2014/0029442 A1 | 1/2014 | Wallman |

(56) References Cited

U.S. PATENT DOCUMENTS

| | | |
|---|---|---|
| 2014/0039683 A1 | 2/2014 | Zimmermann et al. |
| 2014/0040473 A1 | 2/2014 | Ho et al. |
| 2014/0040883 A1 | 2/2014 | Tompkins |
| 2014/0047201 A1 | 2/2014 | Mehta |
| 2014/0053264 A1 | 2/2014 | Dubrovsky et al. |
| 2014/0059187 A1 | 2/2014 | Rosset et al. |
| 2014/0059266 A1 | 2/2014 | Ben-Michael et al. |
| 2014/0086253 A1 | 3/2014 | Yong |
| 2014/0089273 A1 | 3/2014 | Borshack et al. |
| 2014/0095556 A1 | 4/2014 | Lee et al. |
| 2014/0096249 A1 | 4/2014 | Dupont et al. |
| 2014/0105009 A1 | 4/2014 | Vos et al. |
| 2014/0108474 A1 | 4/2014 | David et al. |
| 2014/0109071 A1 | 4/2014 | Ding et al. |
| 2014/0112122 A1 | 4/2014 | Kapadia et al. |
| 2014/0123207 A1 | 5/2014 | Agarwal et al. |
| 2014/0156557 A1 | 6/2014 | Zeng et al. |
| 2014/0164666 A1 | 6/2014 | Yand |
| 2014/0164866 A1 | 6/2014 | Bolotov et al. |
| 2014/0172371 A1 | 6/2014 | Zhu et al. |
| 2014/0173060 A1 | 6/2014 | Jubran et al. |
| 2014/0173195 A1 | 6/2014 | Rosset et al. |
| 2014/0173579 A1 | 6/2014 | McDonald et al. |
| 2014/0189278 A1 | 7/2014 | Peng |
| 2014/0198794 A1 | 7/2014 | Mehta et al. |
| 2014/0211661 A1 | 7/2014 | Gorkemli et al. |
| 2014/0215265 A1 | 7/2014 | Mohanta et al. |
| 2014/0215590 A1 | 7/2014 | Brand |
| 2014/0219086 A1 | 8/2014 | Cantu' et al. |
| 2014/0222953 A1 | 8/2014 | Karve et al. |
| 2014/0229790 A1 | 8/2014 | Goss et al. |
| 2014/0244585 A1 | 8/2014 | Sivasubramanian et al. |
| 2014/0244897 A1 | 8/2014 | Goss et al. |
| 2014/0245435 A1 | 8/2014 | Belenky |
| 2014/0269390 A1 | 9/2014 | Ciodaru et al. |
| 2014/0281700 A1 | 9/2014 | Nagesharao et al. |
| 2014/0297941 A1 | 10/2014 | Rajani et al. |
| 2014/0307578 A1 | 10/2014 | DeSanti |
| 2014/0317206 A1 | 10/2014 | Lomelino et al. |
| 2014/0324862 A1 | 10/2014 | Bingham et al. |
| 2014/0325208 A1 | 10/2014 | Resch et al. |
| 2014/0331276 A1 | 11/2014 | Frascadore et al. |
| 2014/0348166 A1 | 11/2014 | Yang et al. |
| 2014/0355450 A1 | 12/2014 | Bhikkaji et al. |
| 2014/0366155 A1 | 12/2014 | Chang et al. |
| 2014/0376550 A1 | 12/2014 | Khan et al. |
| 2015/0003450 A1 | 1/2015 | Salam et al. |
| 2015/0003458 A1 | 1/2015 | Li et al. |
| 2015/0003463 A1 | 1/2015 | Li et al. |
| 2015/0010001 A1 | 1/2015 | Duda et al. |
| 2015/0016461 A1 | 1/2015 | Qiang |
| 2015/0030024 A1 | 1/2015 | Venkataswami et al. |
| 2015/0046123 A1 | 2/2015 | Kato |
| 2015/0063353 A1 | 3/2015 | Kapadia et al. |
| 2015/0067001 A1 | 3/2015 | Koltsidas |
| 2015/0082432 A1 | 3/2015 | Eaton et al. |
| 2015/0092824 A1 | 4/2015 | Wicker, Jr. et al. |
| 2015/0098470 A1* | 4/2015 | Sun .................. H04L 45/748 370/392 |
| 2015/0120907 A1 | 4/2015 | Niestemski et al. |
| 2015/0121131 A1 | 4/2015 | Kiselev et al. |
| 2015/0127979 A1 | 5/2015 | Doppalapudi |
| 2015/0142840 A1 | 5/2015 | Baldwin et al. |
| 2015/0169313 A1 | 6/2015 | Katsura |
| 2015/0180672 A1 | 6/2015 | Kuwata |
| 2015/0207763 A1 | 6/2015 | Bertran Ortiz et al. |
| 2015/0205974 A1 | 7/2015 | Talley et al. |
| 2015/0222444 A1 | 8/2015 | Sarkar |
| 2015/0229546 A1 | 8/2015 | Somaiya et al. |
| 2015/0248366 A1 | 9/2015 | Bergsten et al. |
| 2015/0248418 A1 | 9/2015 | Bhardwaj et al. |
| 2015/0254003 A1 | 9/2015 | Lee et al. |
| 2015/0254088 A1 | 9/2015 | Chou et al. |
| 2015/0261446 A1 | 9/2015 | Lee |
| 2015/0263993 A1 | 9/2015 | Kuch et al. |
| 2015/0269048 A1 | 9/2015 | Marr et al. |
| 2015/0277804 A1 | 10/2015 | Arnold et al. |
| 2015/0281067 A1 | 10/2015 | Wu |
| 2015/0303949 A1 | 10/2015 | Jafarkhani et al. |
| 2015/0341237 A1 | 11/2015 | Cuni et al. |
| 2015/0341239 A1 | 11/2015 | Bertran Ortiz et al. |
| 2015/0358136 A1 | 12/2015 | Medard |
| 2015/0379150 A1 | 12/2015 | Duda |
| 2016/0004611 A1 | 1/2016 | Lakshman et al. |
| 2016/0011936 A1 | 1/2016 | Luby |
| 2016/0011942 A1 | 1/2016 | Golbourn et al. |
| 2016/0054922 A1 | 2/2016 | Awasthi et al. |
| 2016/0062820 A1 | 3/2016 | Jones et al. |
| 2016/0070652 A1 | 3/2016 | Sundararaman et al. |
| 2016/0087885 A1 | 3/2016 | Tripathi et al. |
| 2016/0088083 A1 | 3/2016 | Bharadwaj et al. |
| 2016/0119159 A1 | 4/2016 | Zhao et al. |
| 2016/0119421 A1 | 4/2016 | Semke et al. |
| 2016/0139820 A1 | 5/2016 | Fluman et al. |
| 2016/0149639 A1 | 5/2016 | Pham et al. |
| 2016/0205189 A1 | 7/2016 | Mopur et al. |
| 2016/0210161 A1 | 7/2016 | Rosset et al. |
| 2016/0231928 A1 | 8/2016 | Lewis et al. |
| 2016/0274926 A1 | 9/2016 | Narasimhamurthy et al. |
| 2016/0285760 A1 | 9/2016 | Dong |
| 2016/0292359 A1 | 10/2016 | Tellis et al. |
| 2016/0294983 A1 | 10/2016 | Kliteynik et al. |
| 2016/0334998 A1 | 11/2016 | George et al. |
| 2016/0366094 A1 | 12/2016 | Mason et al. |
| 2016/0378624 A1 | 12/2016 | Jenkins, Jr. et al. |
| 2016/0380694 A1 | 12/2016 | Guduru |
| 2017/0010874 A1 | 1/2017 | Rosset |
| 2017/0010930 A1 | 1/2017 | Dutta et al. |
| 2017/0019475 A1 | 1/2017 | Metz et al. |
| 2017/0068630 A1 | 3/2017 | Iskandar et al. |
| 2017/0168970 A1 | 6/2017 | Sajeepa et al. |
| 2017/0177860 A1 | 6/2017 | Suarez et al. |
| 2017/0212858 A1 | 7/2017 | Chu et al. |
| 2017/0273019 A1 | 9/2017 | Park et al. |
| 2017/0277655 A1 | 9/2017 | Das et al. |
| 2017/0337097 A1 | 11/2017 | Sipos et al. |
| 2017/0340113 A1 | 11/2017 | Charest et al. |
| 2017/0371558 A1 | 12/2017 | George et al. |
| 2018/0097707 A1 | 4/2018 | Wright et al. |

FOREIGN PATENT DOCUMENTS

| | | |
|---|---|---|
| EP | 2680155 | 1/2014 |
| GB | 2350028 | 5/2001 |
| JP | 2000-242434 | 9/2000 |
| TW | 1566104 | 1/2017 |
| WO | WO 2004/077214 | 9/2004 |
| WO | WO 2016/003408 | 1/2016 |
| WO | WO 2016/003489 | 1/2016 |

OTHER PUBLICATIONS

Author Unknown, "Configuration Interface for IBM System Storage DS5000, IBM DS4000, and IBM DS3000 Systems," IBM SAN Volume Controller Version 7.1, IBM® System Storage® SAN Volume Controller Information Center, Jun. 16, 2013, 3 pages.

Author Unknown, "Coraid EtherCloud, Software-Defined Storage with Scale-Out Infrastructure," Solution Brief, 2013, 2 pages, Coraid, Redwood City, California, U.S.A.

Author Unknown, "Coraid Virtual DAS (VDAS) Technology: Eliminate Tradeoffs between DAS and Networked Storage," Coraid Technology Brief, © 2013 Cora id, Inc., Published on or about Mar. 20, 2013, 2 pages.

Author Unknown, "Creating Performance-based SAN SLAs Using Finisar's NetWisdom" May 2006, 7 pages, Finisar Corporation, Sunnyvale, California, U.S.A.

Author Unknown, "Data Center, Metro Cloud Connectivity: Integrated Metro SAN Connectivity in 16 Gbps Switches," Brocade Communication Systems, Inc., Apr. 2011, 14 pages.

Author Unknown, "Data Center, SAN Fabric Administration Best Practices Guide, Support Perspective," Brocade Communication Systems, Inc., May 2013, 21 pages.

(56) References Cited

OTHER PUBLICATIONS

Author Unknown, "delphi—Save a CRC value in a file, without altering the actual CRC Checksum?" Stack Overflow, stackoverflow.com, Dec. 23, 2011, XP055130879, 3 pages http://stackoverflow.com/questions/8608219/save-a-crc-value-in-a-file-wihout-altering-the-actual-crc-checksum.
Author Unknown, "EMC UNISPHERE: Innovative Approach to Managing Low-End and Midrange Storage; Redefining Simplicity in the Entry-Level and Midrange Storage Markets," Data Sheet, EMC Corporation; published on or about Jan. 4, 2013 [Retrieved and printed Sep. 12, 2013] 6 pages http://www.emc.com/storage/vnx/unisphere.htm.
Author Unknown, "HP XP Array Manager Software—Overview & Features," Storage Device Management Software; Hewlett-Packard Development Company, 3 pages; © 2013 Hewlett-Packard Development Company, L.P.
Author Unknown, "Joint Cisco and VMWare Solution for Optimizing Virtual Desktop Delivery: Data Center 3.0: Solutions to Accelerate Data Center Virtualization," Cisco Systems, Inc. and VMware, Inc., Sep. 2008, 10 pages.
Author Unknown, "Network Transformation with Software-Defined Networking and Ethernet Fabrics," Positioning Paper, 2012, 6 pages, Brocade Communications Systems.
Author Unknown, "Recreating Real Application Traffic in Junosphere Lab," Solution Brief, Juniper Networks, Dec. 2011, 3 pages.
Author Unknown, "Shunra for HP Softwarer," Enabling Confidence in Application Performance Before Deployment, 2010, 2 pages.
Author Unknown, "Software Defined Networking: The New Norm for Networks," White Paper, Open Networking Foundation, Apr. 13, 2012, 12 pages.
Author Unknown, "Software Defined Storage Networks An Introduction," White Paper, Doc # 01-000030-001 Rev. A, Dec. 12, 2012, 8 pages; Jeda Networks, Newport Beach, California, U.S.A.
Author Unknown, "Standard RAID Levels," Wikipedia, the Free Encyclopedia, last updated Jul. 18, 2014, 7 pages; http://en.wikipedia.org/wiki/Standard_RAID_levels.
Author Unknown, "Storage Area Network—NPIV: Emulex Virtual HBA and Brocade, Proven Interoperability and Proven Solution," Technical Brief, Apr. 2008, 4 pages, Emulex and Brocade Communications Systems.
Author Unknown, "Storage Infrastructure for the Cloud," Solution Brief, © 2012, 3 pages; coraid, Redwood City, California, U.S.A.
Author Unknown, "The Fundamentals of Software-Defined Storage, Simplicity at Scale for Cloud-Architectures" Solution Brief, 2013, 3 pages; Coraid, Redwood City, California, U.S.A.
Author Unknown, "VirtualWisdom® SAN Performance Probe Family Models: Probe FC8, HD, and HD48," Virtual Instruments Data Sheet, Apr. 2014 Virtual Instruments. All Rights Reserved; 4 pages.
Author Unknown, "Xgig Analyzer: Quick Start Feature Guide 4.0," Feb. 2008, 24 pages, Finisar Corporation, Sunnyvale, California, U.S.A.
Author Unknown, "Sun Storage Common Array Manager Installation and Setup Guide," Software Installation and Setup Guide Version 6.7.x 821-1362-10, Appendix D: Configuring In-Band Management, Sun Oracle; retrieved and printed Sep. 12, 2013, 15 pages.
Author Unknown, "VBLOCK Solution for SAP: Simplified Provisioning for Operation Efficiency," VCE White Paper, VCE—The Virtual Computing Environment Company, Aug. 2011, 11 pages.
Aweya, James, et al., "Multi-level active queue management with dynamic thresholds," Elsevier, Computer Communications 25 (2002) pp. 756-771.
Berman, Stuart, et al., "Start-up Jeda Networks in Software Defined Storage Network Technology," Press Release, Feb. 25, 2013, 2 pages, http://www.storagenewsletter.com/news/startups/jeda-networks.
Borovick, Lucinda, et al., "White Paper, Architecting the Network for the Cloud," IDC Analyze the Future, Jan. 2011, pp. 1-8.

Chakrabarti, Kaushik, et al., "Locally Adaptive Dimensionality Reduction for Indexing Large Time Series Databases," ACM Transactions on Database Systems, vol. 27, No. 2, Jun. 2009, pp. 188-228.
Chandola, Varun, et al., "A Gaussian Process Based Online Change Detection Algorithm for Monitoring Periodic Time Series," Proceedings of the Eleventh SIAM International Conference on Data Mining, SDM 2011, Apr. 28-30, 2011, 12 pages.
Cisco Systems, Inc. "N-Port Virtualization in the Data Center," Cisco White Paper, Cisco Systems, Inc., Mar. 2008, 7 pages.
Cisco Systems, Inc., "Best Practices in Deploying Cisco Nexus 1000V Series Switches on Cisco UCS B and C Series Cisco UCS Manager Servers," White Paper, Cisco Systems, Inc., Apr. 2011, 36 pages.
Cisco Systems, Inc., "Cisco Prime Data Center Network Manager 6.1," At-A-Glance, © 2012, 3 pages.
Cisco Systems, Inc., "Cisco Prime Data Center Network Manager," Release 6.1 Datasheet, © 2012, 10 pages.
Cisco Systems, Inc., "Cisco Unified Network Services: Overcome Obstacles to Cloud-Ready Deployments," White Paper, Cisco Systems, Inc., Jan. 2011, 6 pages.
Clarke, Alan, et al., "Open Data Center Alliance Usage: Virtual Machine (VM) Interoperability in a Hybrid Cloud Environment Rev. 1.2," Open Data Center Alliance, Inc., 2013, pp. 1-18.
Cummings, Roger, et al., Fibre Channel—Fabric Generic Requirements (FC-FG), Dec. 4, 1996, 33 pages, American National Standards Institute, Inc., New York, New York, U.S.A.
Farber, Franz, et al. "An In-Memory Database System for Multi-Tenant Applications," Proceedings of 14th Business, Technology and Web (BTW) Conference on Database Systems for Business, Technology, and Web, Feb. 28 to Mar. 4, 2011, 17 pages, University of Kaiserslautern, Germany.
Guo, Chang Jie, et al., "IBM Resarch Report: Data Integration and Composite Business Services, Part 3, Building a Multi-Tenant Data Tier with with [sic] Access Control and Security," RC24426 (C0711-037), Nov. 19, 2007, 20 pages, IBM.
Hatzieleftheriou, Andromachi, et al., "Host-side Filesystem Journaling for Durable Shared Storage," 13th USENIX Conference on File and Storage Technologies (FAST '15), Feb. 16-19, 2015, 9 pages; https://www.usenix.org/system/files/conference/fast15/fast15-paper-hatzieleftheriou.pdf.
Hedayat, K., et al., "A Two-Way Active Measurement Protocol (TWAMP)," Network Working Group, RFC 5357, Oct. 2008, 26 pages.
Horn, C., et al., "Online anomaly detection with expert system feedback in social networks," 2011 IEEE International Conference on Acoustics, Speech and Signal Processing (ICASSP), May 22-27, 2011, 2 pages, Prague; [Abstract only].
Hosterman, Cody, et al., "Using EMC Symmetrix Storage inVMware vSph ere Environments," Version 8.0, EMC[2]Techbooks, EMC Corporation; published on or about Jul. 8, 2008, 314 pages; [Retrieved and printed Sep. 12, 2013].
Hu, Yuchong, et al., "Cooperative Recovery of Distributed Storage Systems from Multiple Losses with Network Coding," University of Science & Technology of China, Feb. 2010, 9 pages.
Keogh, Eamonn, et al., "Dimensionality Reduction for Fast Similarity Search in Large Time Series Databases," KAIS Long Paper submitted May 16, 2000; 19 pages.
Kolyshkin, Kirill, "Virtualization in Linux," Sep. 1, 2006, pp. 1-5.
Kovar, Joseph F., "Startup Jeda Networks Takes SDN Approach to Storage Networks," CRN Press Release, Feb. 22, 2013, 1 page, http://www.crn.com/240149244/printablearticle.htm.
Lampson, Butler, W., et al., "Crash Recovery in a Distributed Data Storage System," Jun. 1, 1979, 28 pages.
Lewis, Michael E., et al., "Design of an Advanced Development Model Optical Disk-Based Redundant Array of Independent Disks (RAID) High Speed Mass Storage Subsystem," Final Technical Report, Oct. 1997, pp. 1-211.
Lin, Jessica, "Finding Motifs in Time Series," SIGKDD'02 Jul. 23-26, 2002, 11 pages, Edmonton, Alberta, Canada.
Linthicum, David, "VM Import could be a game changer for hybrid clouds", InfoWorld, Dec. 23, 2010, 4 pages.
Long, Abraham Jr., "Modeling the Reliability of RAID Sets," Dell Power Solutions, May 2008, 4 pages.

(56) References Cited

OTHER PUBLICATIONS

Ma, Ao, et al., "RAIDShield: Characterizing, Monitoring, and Proactively Protecting Against Disk Failures," FAST '15, 13$^{th}$ USENIX Conference on File and Storage Technologies, Feb. 16-19, 2015, 17 pages, Santa Clara, California, U.S.A.
Mahalingam, M., et al., "Virtual eXtensible Local Area Network (VXLAN): A Framework for Overlaying Virtualized Layer 2 Networks over Layer 3 Networks," Independent Submission, RFC 7348, Aug. 2014, 22 pages; http://www.hip.at/doc/rfc/rfc7348.html.
McQuerry, Steve, "Cisco UCS M-Series Modular Servers for Cloud-Scale Workloads," White Paper, Cisco Systems, Inc., Sep. 2014, 11 pages.
Monia, Charles, et al., IFCP—A Protocol for Internet Fibre Channel Networking, draft-monia-ips-ifcp-00.txt, Dec. 12, 2000, 6 pages.
Mueen, Abdullah, et al., "Online Discovery and Maintenance of Time Series Motifs," KDD'10 The 16th ACM SIGKDD International Conference on Knowledge Discovery and Data Mining, Jul. 25-28, 2010, 10 pages, Washington, DC, U.S.A.
Muglia, Bob, "Decoding SDN," Jan. 14, 2013, Juniper Networks, pp. 1-7, http://forums.juniper.net/t5/The-New-Network/Decoding-SDN/ba-p/174651.
Murray, Joseph F., et al., "Machine Learning Methods for Predicting Failures in Hard Drives: A Multiple-Instance Application," Journal of Machine Learning Research 6 (2005), pp. 783-816; May 2005, 34 pages.
Nelson, Mark, "File Verification Using CRC," Dr. Dobb's Journal, May 1, 1992, pp. 1-18, XP055130883.
Pace, Alberto, "Technologies for Large Data Management in Scientific Computing," International Journal of Modern Physics C., vol. 25, No. 2, Feb. 2014, 72 pages.
Petersen, Chris, "Introducing Lightning: A flexible NVMe JBOF," Mar. 9, 2016, 6 pages.
Pinheiro, Eduardo, et al., "Failure Trends in a Large Disk Drive Population," FAST '07, 5$^{th}$ USENIX Conference on File and Storage Technologies, Feb. 13-16, 2007, 13 pages, San Jose, California, U.S.A.
Raginsky, Maxim, et al., "Sequential Anomaly Detection in the Presence of Noise and Limited Feedback," arXiv:0911.2904v4 [cs.LG] Mar. 13, 2012, 19 pages.
Saidi, Ali G., et al., "Performance Validation of Network-Intensive Workloads on a Full-System Simulator," Interaction between Operating System and Computer Architecture Workshop, (IOSCA 2005), Austin, Texas, Oct. 2005, 10 pages.
Sajassi, A., et al., "BGP MPLS Based Ethernet VPN," Network Working Group, Oct. 18, 2014, 52 pages.
Sajassi, Ali, et al., "A Network Virtualization Overlay Solution using EVPN," L2VPN Workgroup, Nov. 10, 2014, 24 pages; http://tools.ietf.org/pdf/draft-ietf-bess-evpn-overlay-00.pdf.
Sajassi, Ali, et al., "Integrated Routing and Bridging in EVPN," L2VPN Workgroup, Nov. 11, 2014, 26 pages; http://tools.ietf.org/pdf/draft-ietf-bess-evpn-inter-subnet-forwarding-00.pdf.
Schroeder, Bianca, et al., "Disk failures in the real world: What does an MTTF of 1,000,000 hours mean to you?" FAST '07: 5$^{th}$ USENIX Conference on File and Storage Technologies, Feb. 13-16, 2007, 16 pages, San Jose, California, U.S.A.
Shue, David, et al., "Performance Isolation and Fairness for Multi-Tenant Cloud Storage," USENIX Association, 10$^{th}$ USENIX Symposium on Operating Systems Design Implementation (OSDI '12), 2012, 14 pages; https://www.usenix.org/system/files/conference/osdi12/osdi12-final-215.pdf.
Staimer, Marc, "Inside Cisco Systems' Unified Computing System," Dragon Slayer Consulting, Jul. 2009, 5 pages.
Stamey, John, et al., "Client-Side Dynamic Metadata in Web 2.0," SIGDOC '07, Oct. 22-24, 2007, pp. 155-161.
Swami, Vijay, "Simplifying SAN Management for VMWare Boot from SAN, Utilizing Cisco UCS and Palo," posted May 31, 2011, 6 pages.
Tate, Jon, et al., "Introduction to Storage Area Networks and System Networking," Dec. 2017, 302 pages, ibm.com/redbooks.
Vuppala, Vibhavasu, et al., "Layer-3 Switching Using Virtual Network Ports," Computer Communications and Networks, 1999, Proceedings, Eight International Conference in Boston, MA, USA, Oct. 11-13, 1999, Piscataway, NJ, USA, IEEE, ISBN: 0-7803-5794-9, pp. 642-648.
Wang, Feng, et al. "OBFS: A File System for Object-Based Storage Devices," Storage System Research Center, MSST. vol. 4., Apr. 2004, 18 pages.
Weil, Sage A., "Ceph: Reliable, Scalable, and High-Performance Distributed Storage," Dec. 2007, 239 pages, University of California, Santa Cruz.
Weil, Sage A., et al. "Ceph: A Scalable, High-performance Distributed File System," Proceedings of the 7th symposium on Operating systems design and implementation. USENIX Association, Nov. 6, 2006, 14 pages.
Weil, Sage A., et al. "CRUSH: Controlled, Scalable, Decentralized Placement of Replicated Data." Proceedings of the 2006 ACM/IEEE conference on Supercomputing. ACM, Nov. 11, 2006, 12 pages.
Wu, Joel, et al., "The Design, and Implementation of AQuA: An Adaptive Quality of Service Aware Object-Based Storage Device," Department of Computer Science, MSST, May 17, 2006, 25 pages; http://storageconference.us/2006/Presentations/30Wu.pdf.
Xue, Chendi, et al. "A Standard framework for Ceph performance profiling with latency breakdown," Ceph, Jun. 30, 2015, 3 pages.
Zhou, Zihan, et al., "Stable Principal Component Pursuit," arXiv:1001.2363v1 [cs.IT], Jan. 14, 2010, 5 pages.
Zhu, Yunfeng, et al., "A Cost-based Heterogeneous Recovery Scheme for Distributed Storage Systems with RAID-6 Codes," University of Science & Technology of China, 2012, 12 pages.

* cited by examiner

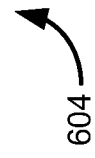
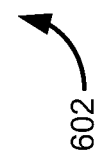
FIG. 6

Fig 1
Route insertion order ( without regrooming) — 802
1) 1.0.0.0/21 1000 routes creates Tile 0
2) 2.0.0.0/22 1000 routes creates Tile 1
3) 3.0.0.0/23 1000 routes creates Tile 2
4) 4.0.0.0/24 1000 routes creates Tile 3
5) 5.0.0.0/25 1000 routes creates Tile 4
6) 6.0.0.0/26 1000 routes creates Tile 5
7) 7.0.0.0/27 1000 routes(No tiles available)

804 →

| | |
|---|---|
| Pivot tile 0 | Base width v4 :18 |
| Pivot tile 1 | Base width v4 :19 |
| Pivot tile 2 | Base width v4 :20 |
| Pivot tile 3 | Base width v4 :21 |
| Pivot tile 4 | Base width v4 :22 |
| Pivot tile 5 | Base width v4 :23 |

806 →

Fig 2
Route insertion order (without regrooming) — 808
1) 7.0.0.0/27 1000 routes creates Tile 0
2) 6.0.0.0/26 1000 routes occupy Tile 0
3) 5.0.0.0/25 1000 routes occupy Tile 0
4) 4.0.0.0/24 1000 routes occupy Tile 0
5) 3.0.0.0/23 1000 routes creates Tile 1
6) 2.0.0.0/22 1000 routes occupy Tile 1
7) 1.0.0.0/21 1000 routes occupy Tile 1 (we are still left with 4 empty Pivot tiles)

810 →

| | |
|---|---|
| Pivot tile 0 | Base width v4 :24 |
| Pivot tile 1 | Base width v4 :20 |
| Pivot tile 2 | Base width v4 :0 |
| Pivot tile 3 | Base width v4 :0 |
| Pivot tile 4 | Base width v4 :0 |
| Pivot tile 5 | Base width v4 :0 |

812 →

Fig 3
Route insertion order (with regrooming) — 814
1) 1.0.0.0/21 1000 routes creates Tile 0 BV 18
2) 2.0.0.0/22 1000 routes creates Tile 1 BV 19
3) 3.0.0.0/23 1000 routes creates Tile 2 BV 20
4) 4.0.0.0/24 1000 routes creates Tile 3 BV 21
5) 5.0.0.0/25 1000 routes creates Tile 4 BV 22
6) 6.0.0.0/26 1000 routes creates Tile 5 BV 23
7) 7.0.0.0/27 1000 routes (routes in tile 0 BV 18 will be moved to tile 1 BV 19 to free tile 0 to create tile 0 with BV 24 to accommodate /27 routes)

816 →

| | |
|---|---|
| Pivot tile 0 | Base width v4 :24 |
| Pivot tile 1 | Base width v4 :19 |
| Pivot tile 2 | Base width v4 :20 |
| Pivot tile 3 | Base width v4 :21 |
| Pivot tile 4 | Base width v4 :22 |
| Pivot tile 5 | Base width v4 :23 |

DYNAMIC ROUTE PROFILE STORAGE IN A HARDWARE TRIE ROUTING TABLE

CROSS-REFERENCE TO RELATED APPLICATIONS

This application is a continuation of U.S. Non-Provisional patent application Ser. No. 16/557,298, filed Aug. 30, 2019, which is a continuation of U.S. Non-Provisional patent application Ser. No. 15/723,713, filed Oct. 3, 2017, the full disclosures of which are incorporated herein by reference in their entireties.

TECHNICAL FIELD

The present disclosure relates generally to communication networks, and more specifically to IP (Internet Protocol) address storage and lookup for use in transmission of network traffic.

BACKGROUND

Telecommunication networks, or other types of computer networks, provide for the transmission of information across some distance through terrestrial, wireless or satellite communication networks and devices. Such communications may involve voice, data or multimedia information, among others. In general, devices of the network may include methods, components, circuits, programs, etc. to look up a destination Internet Protocol (IP) address of a received packet in an address table to determine how the packet should be routed to the next device in the network or through the entire network to the destination. Upon accessing the address table, the device may perform a longest prefix match on the destination address against a prefix table containing a large number of entries accessible by the device. In many cases, this occurs at a very high speed. After the match is identified, the corresponding information is used to forward the packet to the next device in the network such that the packet may be directed toward the destination device.

BRIEF DESCRIPTION OF THE DRAWINGS

The above-recited and other advantages and features of the disclosure will become apparent by reference to specific embodiments thereof which are illustrated in the appended drawings. Understanding that these drawings depict only example embodiments of the disclosure and are not therefore to be considered to be limiting of its scope, the principles herein are described and explained with additional specificity and detail through the use of the accompanying drawings in which:

FIG. 6 is a diagram illustrating application of the dynamic hash allocation in a plurality of pivot tiles of a networking device;

FIG. 8 is a diagram illustrating regrouping of pivot tiles of a network device to efficiently allocate different base widths of the pivot tiles;

DESCRIPTION OF EXAMPLE EMBODIMENTS

Figure 1:
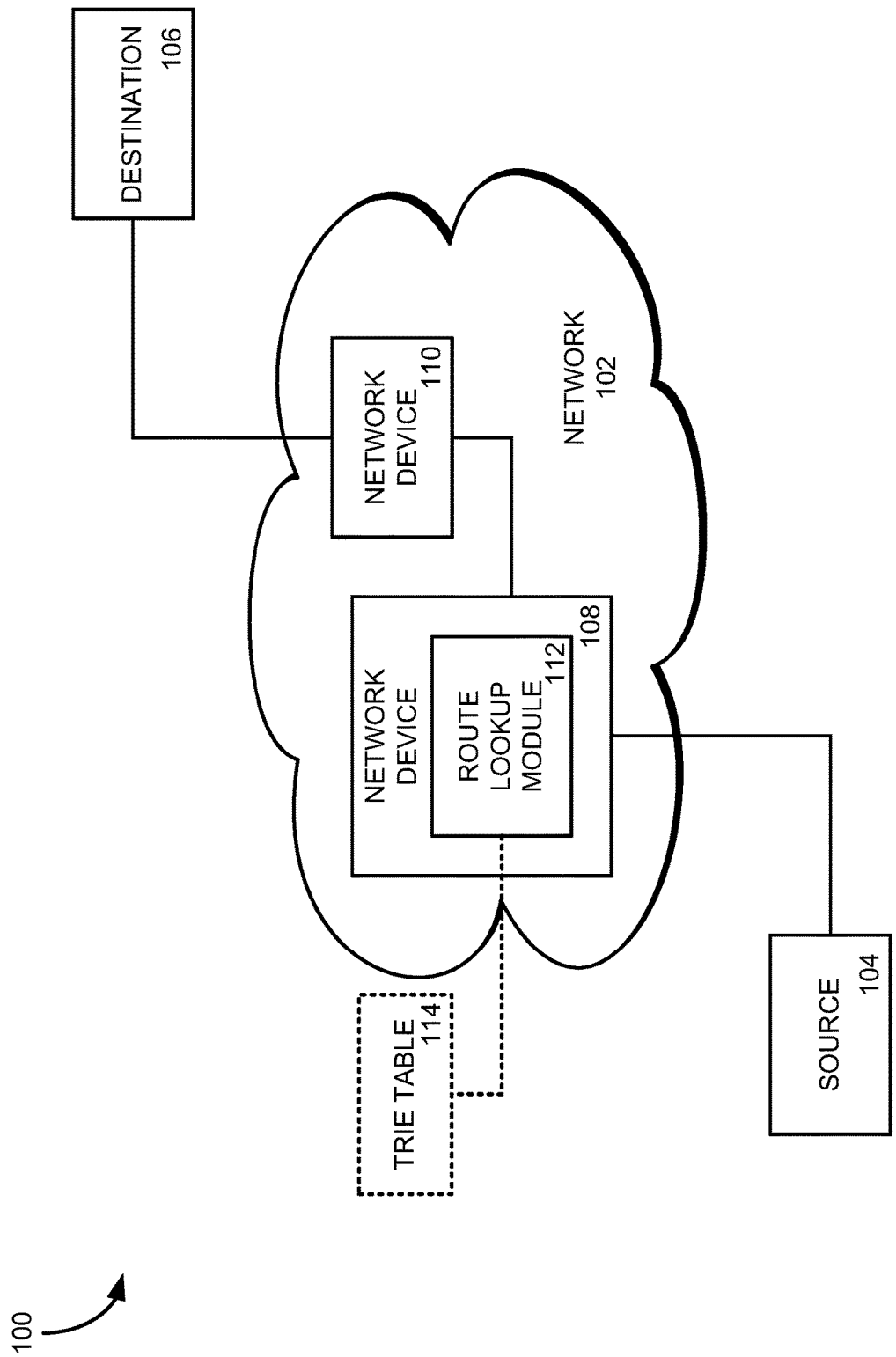
FIG. 1 is a system diagram of an example network architecture.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Overview:

A system, network device, method, and/or computer readable storage medium is disclosed for managing a routing table of a networking device. Managing the routing table may include maintaining a plurality of pivot tiles in memory for storing pivot entries each comprising a plurality of received route prefixes of a routing table, each of the plurality of pivot tiles associated with a hash function and a prefix base width and selecting a first of the plurality of pivot tiles for grooming. Grooming the first of the plurality of pivot tiles may include relocating at least a first pivot entry from the first of the plurality of pivot tiles to a Ternary Content-Addressable Memory (TCAM), moving at least a second pivot entry from the first of the plurality of pivot tiles to a second of the plurality of pivot tiles, and returning the first of the plurality of pivot tiles to a shared pool of pivot tiles for reallocation when the plurality of received route prefixes of the routing table stored in the first of the plurality of pivot tiles are removed Other implementations include dynamically associating a first hash function with the first of the plurality of pivot tiles and a second hash function with the second of the plurality of pivot tiles, the first hash function different than the second hash function, and wherein the first hash function provides a storage location within the first of the plurality of pivot tiles based at least on a portion of a prefix to be stored in the first of the plurality of pivot tiles. Selecting the first hash function for the first of the plurality of pivot tiles may be based at least on a distribution of each hash function for the plurality of pivot tiles.

In still other implementations may include detecting a hash collision at the location for the second pivot entry in the second of the plurality of the pivot tiles between the second pivot entry and an occupying pivot entry of the second of the plurality of the pivot tiles. Upon the collision, the method may copy the occupying pivot entry of the second of the plurality of the pivot tiles to the TCAM or to a third of the plurality of pivot tiles and relocating the second pivot entry to the location for the second pivot entry in the second of the plurality of the pivot tiles.

Example Embodiments

Aspects of the present disclosure involve systems and methods for managing a trie routing table for a networking device of a communication or computer network. In one implementation, the networking device may utilize a dynamic algorithm for associating hashing functions with pivot tiles of the routing table. The dynamic hash type selection algorithm may operate to maximize or improve the hash utilization within the routing table to avoid hash collisions upon entry of additional route prefixes to the table. In other implementations, pivots or prefixes may be relocated from pivot tiles in an attempt to free the tiles for reallocation to other prefix base width. This may improve the overall utilization of the pivot tiles, preventing over or under population of prefixes within the tiles and improving the speed of route lookup from the table. In still other implementations, prefixes or pivots may be relocated to other possible pivot tiles or to a general storage space when a hash collision is detected. This provides for even distribution of pivots within tiles which have base widths in range of a pivot route. The above implementations may occur together or separately to improve the operation of the networking device and provide faster route lookup.

Networking devices may utilize many types of tables, circuits, and programs to determine how a received packet is to be routed. One particular embodiment may utilize an Application Specific Integrated Circuit (ASIC) to provide a forwarding pipeline for the networking device to support various forwarding scales depending on the position of a forwarding device (e.g., switch) in a network. In conventional ASICs, templates generally are defined to accommodate prefix scale. However, if prefix base widths are statically set on memory tiles, the tiles may need to be reconfigured to account for changes in routes in the network received at the network device.

Implementations of software algorithms and hardware architectures of ASICs to efficiently store address prefix tables in memory and process lookups at a very high speed in a networking device are discussed below. In one or more embodiments, a software algorithm works in tandem with hardware capabilities in a dynamic manner to accommodate varying route profiles. As described in detail below, one or more embodiments may dynamically store prefixes in a memory tile (e.g., pivot tile), providing increased flexibility for the hardware.

Beginning with reference to FIG. 1, an example of a network in which embodiments described herein may be implemented is shown. For simplification, only a small number of nodes of the network environment 100 are shown. The network environment 100 includes a data communication network 102 or other type of computing network. The network 102 may include any number of network devices, such as network device 108 and network device 110, in communication via any number of nodes. Network devices 108, 110 or nodes may be any type of network device, such as but not limited to, routers, switches, gateways, controllers, edge devices, access devices, aggregation devices, core nodes, intermediate nodes, or other network devices. Through the communication between the devices, data or communication packets may be passed or transmitted within the network. The network devices 108, 110 may communicate over one or more networks (e.g., local area network (LAN), metropolitan area network (MAN), wide area network (WAN), virtual private network (VPN), virtual local area network (VLAN), wireless network, enterprise network, corporate network, data center, Internet, intranet, radio access network, public switched network, or any other network).

In the simplified example shown in FIG. 1, a source device 104 is in communication with destination device 106 over network 102. The network path shown between the source device 104 and destination device 106 includes two network devices (forwarding devices), network devices 108, and 110. Although only two network devices 108, 110 are illustrated, it should be appreciated that any number of devices may be included in the network 102. In general, the network devices 108, 110 may include switches, routers, switches/routers, or other network devices comprising network routing or switching elements configured to perform forwarding functions. The network 102 may also include any number of sources, destinations, and intermediate nodes to facilitate the exchange of data and/or communication packets between source device 104 and destination device 106.

Packets originating from the source device 104 are typically forwarded over the network 102 through selected network devices 108, 110 to the destination device 106. Each network device 108, 110 may maintain a forwarding table and next-hop table in an ASIC configuration or other integrated circuit device, although any storage medium for maintaining the forwarding table may be utilized. The forwarding table generally contains IP (Internet Protocol) addresses (e.g., IPv4, IPv6) of other nodes on the network, whereas the next-hop table contains addresses of directly coupled neighboring nodes. Each IP address in the forwarding table is associated with one or more next-hop addresses in the next-hop table.

When a packet is received at the network device 108, a destination IP address may be obtained from the received packet and compared to one or more memory tiles stored in the ASIC, as described in more detail below. In case of multiple matches of the destination IP address, longest matching prefix information is typically used. In one embodiment, a combination of hash lookup and trie lookup may be used to find the longest prefix match utilizing memory tiles.

In one particular implementation, the network device 108 shown in FIG. 1 includes a route lookup module 112. The route lookup module 112 may identify host routes or longest prefix match routes, for example. In one embodiment, the route lookup module 112 comprises one or more of a dynamic trie 114 routing table (e.g., software, firmware, code, logic, hardware) operable to store address prefixes and next-hop information for use in a lookup performed for forwarding packets from the source device 104 to destination device 106. In general, the trie is an ordered tree structure for storing a dynamic or associative array of data, such as a routing address prefix. In this implementation, the dynamic trie 114 may include one or more software algorithms (e.g., logic, code) and hardware architecture (e.g., memory tiles stored in ASIC) for configuring a device for storing varying route profiles. A lookup may be performed, for example, for a destination IP address contained in a packet received at network device 108 for a next-hop IP address of network device 110. Network device 110 may also comprise a route lookup module similar to route lookup module 112 for additional routing of a received packet based on routing information received at the network device. Prefixes and next-hop information may be stored on any number of memory tiles such as one or more pivot tiles, trie tiles, and next-hop tiles.

The term "memory tile" or "tile" as used herein refers to any table or data structure or portion, section, or group of memory on an ASIC or other memory device for storing parts of a lookup table including entries associated with routes, addresses, adjacency information, and the like. More specifically, the terms "pivot tile", "trie tile", and "next-hop tile" as used herein refer to a portion of memory reserved for storing specific types of entries (e.g., covering prefix (pivot), trie indices, and adjacency indices).

As described below, the term "pivot" as used herein refers to a covering prefix (e.g., parent prefix (node) or root of subtree, address (prefix) that covers or includes other addresses (prefixes)). The term "prefix" as used herein refers to a network or route prefix. The term "base-width" as used herein refers to a prefix (or pivot) length (bit-length of prefix) and may be associated with a mask. The prefix may be associated with an IPv4 (Internet Protocol version 4) or IPv6 (Internet Protocol version 6) address, for example.

Figure 2:
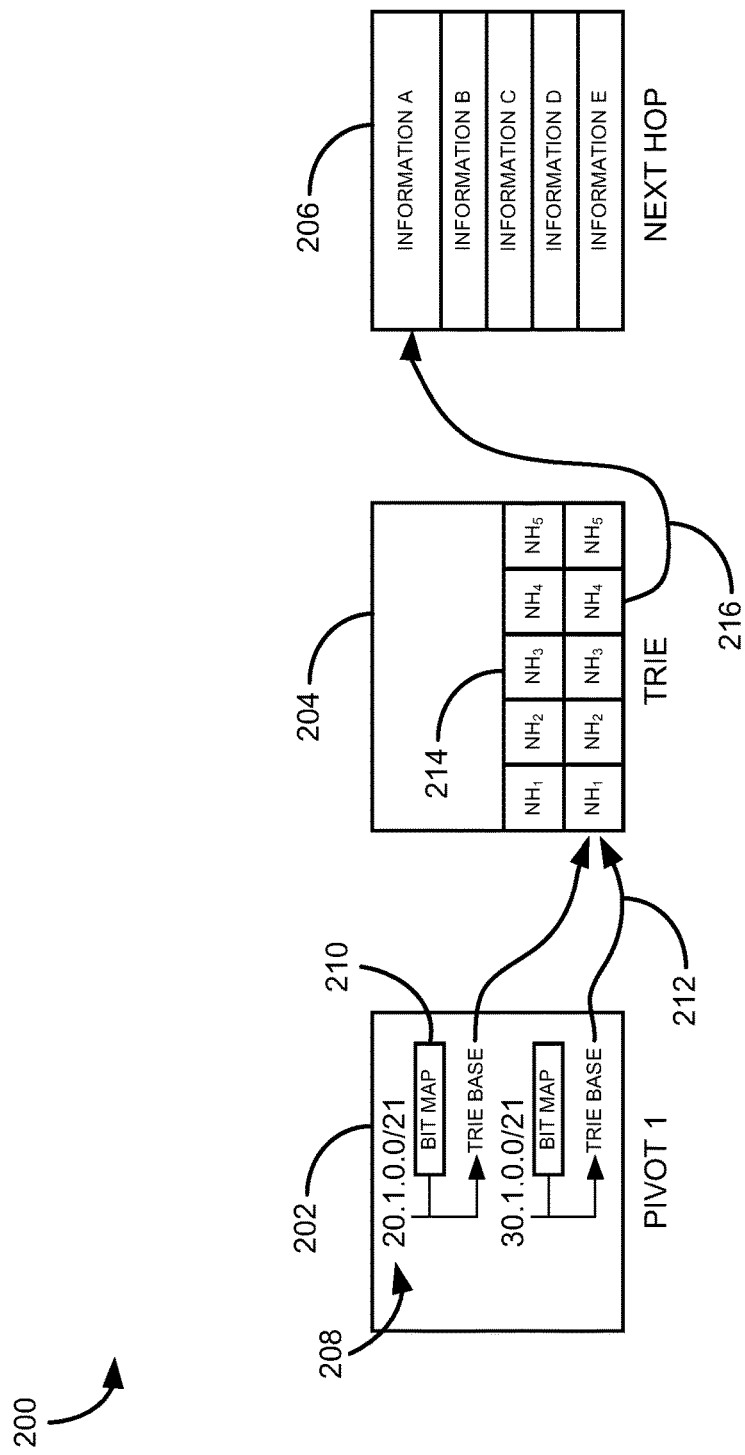
FIG. 2 is a schematic diagram of a pivot, trie, and next-hop tiles for use in performing a route lookup of a networking device.

Turning now to FIG. 2, a schematic diagram of one or more pivot tiles 202, trie tiles 204, and next-hop tiles 206 (also referred to as a forwarding pipeline) for use in performing a route lookup of a networking device. In one particular implementation, the forwarding pipeline 200 is embodied on an ASIC of the networking device and may be split into stages. A route lookup table may be broken up into the tiles 202-206 and may be allocated to a specific forwarding entry type (e.g., IP LPM (IPv4, IPv6), ECMP, and Adjacency). Each tile 202-206 of the chain may thus store the prefixes of a certain range of prefix lengths. In a first stage, prefixes may be compressed and stored with a covering prefix (referred to herein as a pivot) on a pivot tile 202. The pivot tile 202 stores pivot entries corresponding to one or more prefix entries associated with an IP address. A pivot entry comprises a covering prefix (pivot) 208, sub-tree members 210, which may be enumerated as individual bits in a bitmap based on position, and one or more pointers 212 to an index in a second stage 204. The second stage tile may be referred to as a trie index or trie tile 204. One or more pivot values may be selected to divide prefixes evenly into groups. The tree bitmap contains a bitmap of the sub-trie and a pointer for next-hop, and a bitmap for a head pointer to a block of child nodes (routes) 216 on the trie tile 204.

In the second stage 204, the prefixes that are present in the sub-tree have their net-hop pointers enumerated with the trie index as the base offset. The trie tile 204 stores child route information of the prefix entries in the pivot tile. The second stage may include pointers 216 to adjacency indices that contain rewrite information (e.g., information A, information B, information C, information D, information E, etc.) in a third stage (referred to as a next-hop tile) 206. The next-hop tile 206 stores adjacency (next-hop) information.

In one embodiment, the number of pivots that are needed on the pivot tiles 202 are optimized based on a traffic profile and typically include prefixes of a particular mask length (M). In another embodiment, compressed logic may be used for next-hop sharing so that multiple pivots may point to the same row comprising next-hop information on the trie tile (referred to herein as compressed trie). Further, one or more prefixes may be stored in a TCAM (Ternary Content-Addressable Memory) and then moved to the pivot tile 202 when a utilization threshold has been reached at the TCAM.

Figure 3:
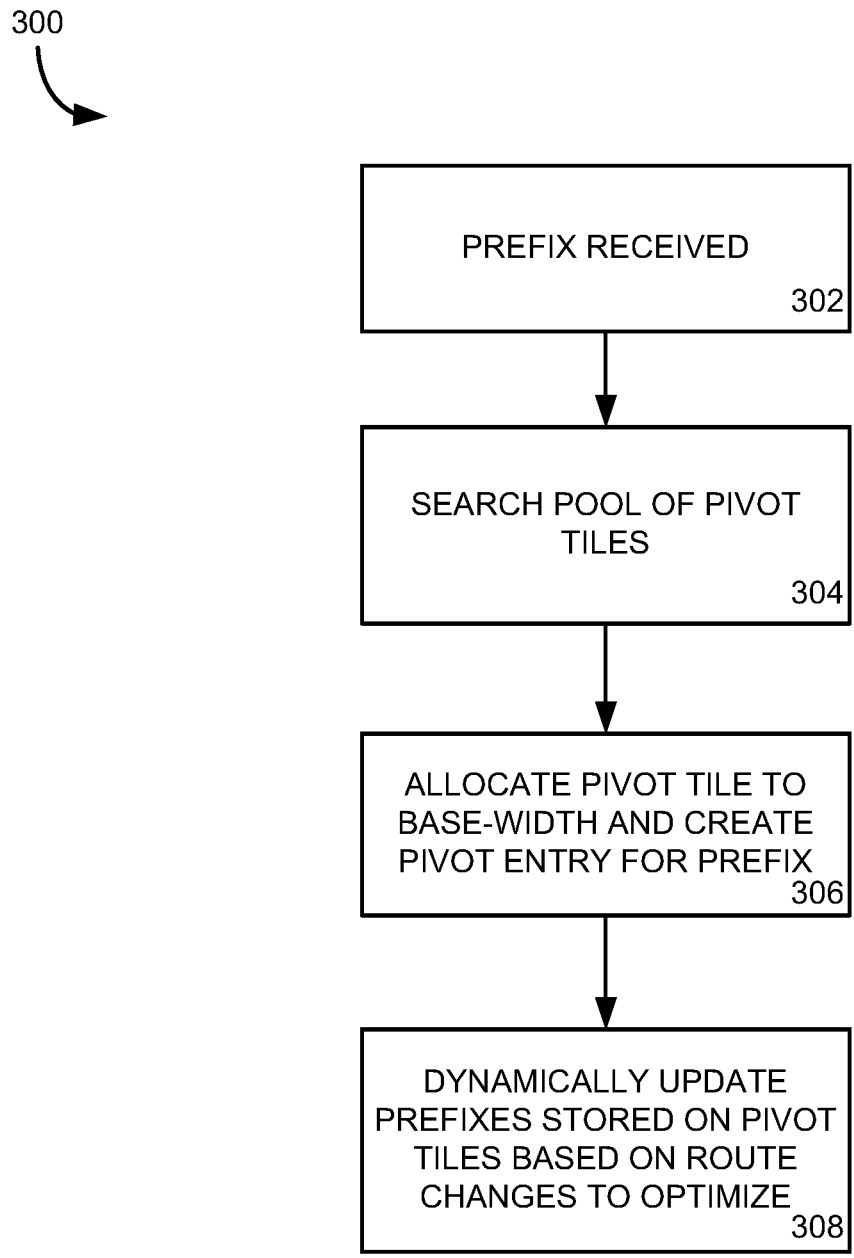
FIG. 3 is a flowchart of a method for dynamic storage of routing prefixes in a pivot tile of a networking device.

FIG. 3 is a flowchart illustrating an overview of a process for storing route information in a dynamic trie, in accordance with one embodiment. In operation 302, prefixes corresponding to routes in the network are received at a network device (e.g., networking device 108 in FIG. 1). In one example, a request may be received to add a prefix to memory for a route lookup at the forwarding device. As described above with respect to FIG. 2, the memory may include a plurality of memory tiles for storing pivot entries, a trie index, and a next-hop index. Prefixes are dynamically selected for efficient storage in the pivot tiles 202 by searching a dynamic pool of pivot tiles 202 for an available pivot tile based on a base-width in operation 304. If a pivot tile is available based on a search of the dynamic pool of pivot tiles 202, a tile (or at least a portion of the pivot tile) may be allocated for the base-width in operation 306. A pivot entry is created on the available pivot tile for the prefix and other prefixes with a corresponding mask (base-width) based on a hashing function described in more detail below. In one embodiment, elements in TCAM with a corresponding base-width may also be moved onto the allocated pivot tile. Further, the prefixes stored on the pivot tile may be dynamically updated based on route changes to optimize storage on the pivot tile 202 in operation 308. For example, new prefixes may be added to the pivot tile or prefixes may be deleted from the pivot tile if no longer needed. Memory (pivot tiles) may therefore be adjusted for varying route profiles.

In one embodiment, once a base-width is set on a tile, the pivots of only that mask length are available for programming onto that pivot tile. Thus, when there is T such tiles (e.g., T equal to 8, 12, or any other number depending on the layout) allocated, there is a limited number of pivot tiles. Given the prefix distribution, a challenge is to fit in the maximum number of pivots, given the minimal number of hash collisions.

In some implementations, a small scratchpad TCAM (Ternary Content-Addressable Memory) may be used to aid the networking device in maintaining some received prefixes until a TCAM threshold of similar prefixes (based on base-widths) is reached on a per prefix length. When this threshold is reached for prefixes of a given prefix-length in TCAM, migration to pivot tiles may take place. Additionally, a pivot may cover prefixes that are three additional levels deep in the hardware to allow more prefixes to be stored within the pivot.

Figure 4:
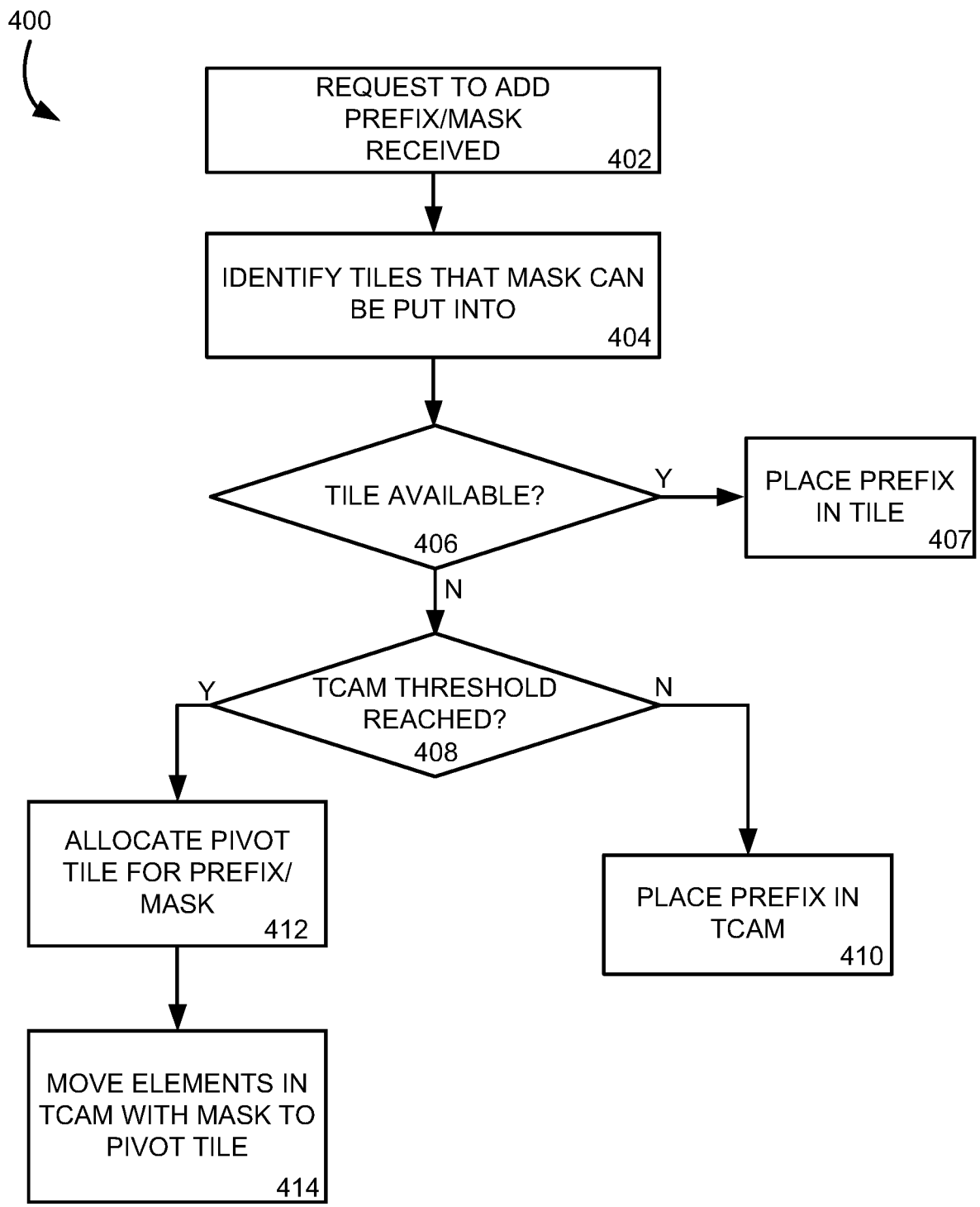
FIG. 4 is a flowchart of a method for adding a prefix in a dynamic trie structure of a networking device.

FIG. 4 is a flowchart of a method 400 for adding a prefix in a dynamic trie structure of a networking device. As previously described, one or more dynamic trie embodiments allow pivot tile base-widths to be chosen dynamically when prefixes are learned and TCAM thresholds are reached for each prefix length (if TCAMs are used for storage). Beginning at operation 402, a request for adding a prefix/mask (P/M) is received at a networking device. The possible tiles that the mask (M) can get into are identified in operation 404. In one pivot tile configuration, a pivot covers prefixes that are three additional levels deep in the hardware. Thus, the prefix with mask (M) may potentially get into tiles that have a base-width of M-3, M-2, M-1, or M (preferably in that order). Different depth levels may be used in some instances such that the base-width may be M-K, where K is the depth of the hardware lookup available for a specific address family.

If pivot tiles are available, the prefix (prefix/mask) may be stored into the available tile in operation 407. If no tiles are available or there is no space in the dynamic pool of pivot tiles in operation 406, or if the specified TCAM threshold for the mask length M has not been reached in operation 408, the prefix (prefix/mask) is placed into TCAM in operation 410. However, if the TCAM threshold has been reached and/or if a tile exists in the dynamic pool of pivot tiles (i.e., pivot tile is free and not yet associated with any base-width), the pivot tile is allocated in operation 412 with the base as (M-3) (or placed in one of the tiles with ordered preference of tile with base-width M-3, M-2, M-1). For IPv6 prefixes, the lowest depth for a pivot route may be M-4. Further, elements (or prefixes) in TCAM with mask M (same base-width) or up to M-3 may then be moved into the pivot tile provided hash collisions do not occur in operation 410.

Once one or more pivot tiles 202 are allocated, similar route prefixes received at the networking device may be included in the pivots if the base width is at least M-3 of the allocated tile. For example, through the above method 400, a new tile created for /24 v4 prefixes has a (24−3)=21 base width. Similarly, a new tile created for /64 V6 prefix has a (64−4)=60 base width. Thus, maximum trie utilization occurs when prefixes are inserted from highest to lowest prefix length order. Sub-optimal trie utilization, on the other hand, is observed when prefixes are inserted from lowest to highest prefix length order. However, because the order in which route prefixes are received at the networking device and inserted into the allocated pivots is not controlled by the device but rather occurs as routes are received, achieving optimal trie utilization becomes difficult. Moreover, the same pivot tile may be shared by both v4 prefixes and v6 prefixes such that utilization may vary widely when the set of v4 and v6 prefixes are inserted as received. Thus, methods and systems for improving the utilization of trie tiles 202 in the networking device are now described.

As mentioned above, the ASIC or networking device may utilize a hash function to determine a location within a particular pivot tile for storing a received prefix. In general, the networking device applies a hash function to some aspects of the received prefix to determine a location in the pivot tile memory at which the prefix is stored. In some implementations, the ASIC may utilize four different hash functions and each pivot tile is assigned or associated with one of the four hash functions. Thus, a hash location of the same prefix can vary depending on the selected hash type. In the case of a v6 prefix that spans two pivot tiles, the hash function associated with the first pivot tile (referred to herein as the left tile) of the prefix span is used to determine the location within the pivot tile for the v6 prefix.

When a prefix is installed in a pivot tile, the networking device executes a lookup in the pivot tile at a location determined by the hash function. In one implementation, the hash function takes as inputs the prefix virtual routing and forwarding information, IP address, and the prefix length, although any aspect of the prefix may be used as an input to the hash function for the particular pivot tile. As should be appreciated, hash types within the same base width tiles should be distributed evenly to achieve the best hash utilization. However, because multiple address families (v4 and v6) can share the same pivot tile and prefixes are generally learned in the order received, some dynamic hash type selection for pivot tiles may improve the overall efficiency of the networking device route lookup.

Figure 5:
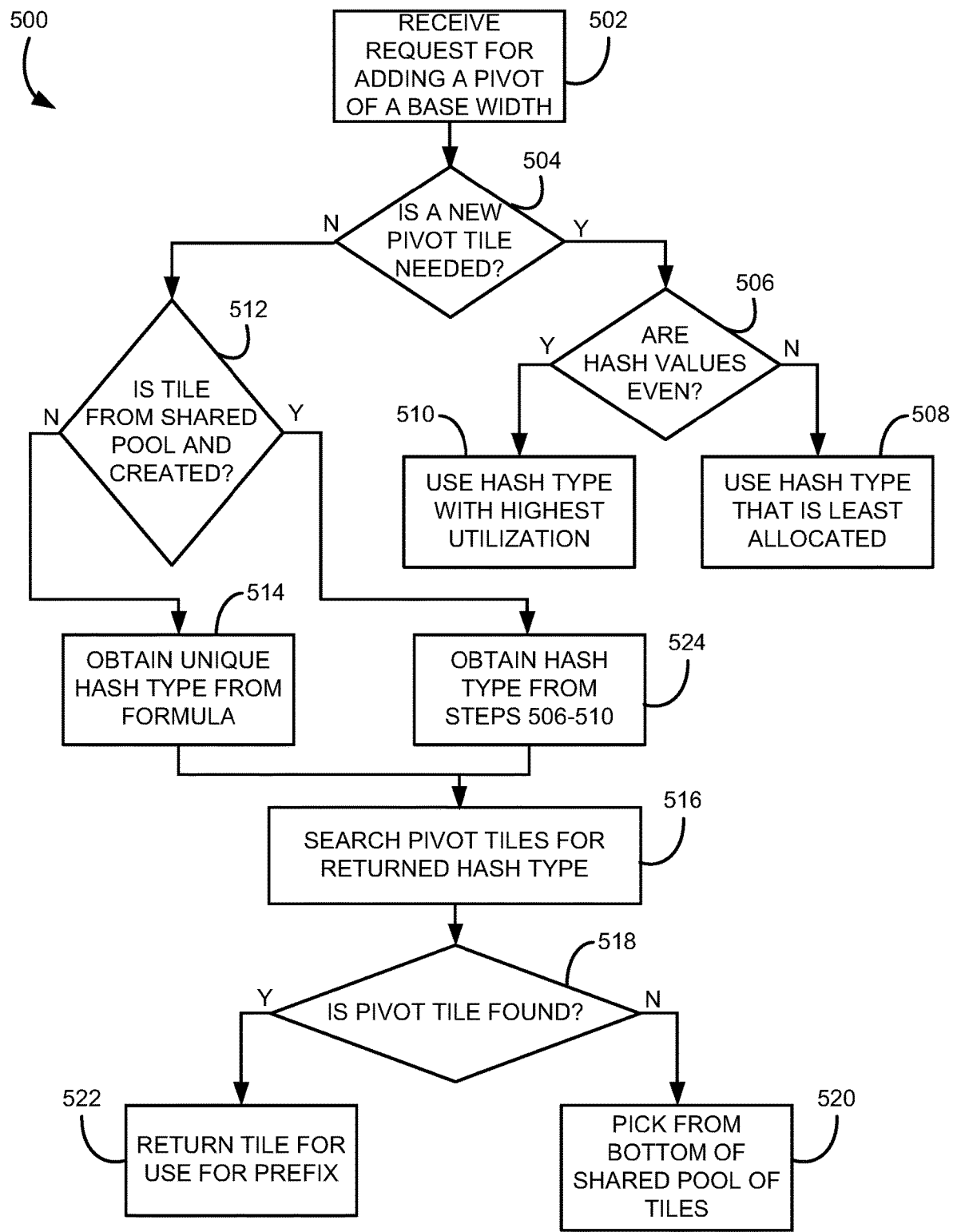
FIG. 5 is a flowchart of a method for dynamic hash allocation of pivot tiles for efficient hash utilization in a network device.

FIG. 5 is a flowchart of a method 500 for dynamic hash allocation of pivot tiles for efficient hash utilization in a network device. Through the method, the hash location of the same prefix can vary dependent on the selected hash type for the pivot tile selected for the prefix. In general, the method 500 is executed by the networking device when either a new pivot tile is created or an already allocated tile is shared with another address family.

An example configuration of pivot tiles is provided below in table 1:

TABLE 1

| Tile ID | Hash Function | # of v4 Prefixes/Base Widths | # of v6 Prefixes/Base Widths |
|---|---|---|---|
| 0 | 0 | 130/21 | 0/0 |
| 1 | 1 | 150/21 | 0/0 |
| 2 | 2 | 100/21 | 0/0 |
| 3 | 3 | 90/21 | 0/0 |
| 4 | 2 | 170/21 | 0/0 |
| 5 | 0 | 110/21 | 0/0 |

Assume that the networking device has a maximum of eight pivot tiles. The allocation of hash functions for pivot tiles 0-5 in Table 1 may occur through the dynamic hash allocation method 500 described herein or may just occur through any other formula executed by the networking device.

Beginning in operation 502 of the method 500 of FIG. 5, the networking device receives a route prefix to be located in a pivot tile. The received prefix may initiate the creation of new pivot tile or another address family is to be shared with an existing tile. Thus, the networking device generates a request to create a new tile of a specific base width or an address family. Beginning in operation 504, the networking device determines if a new tile is to be created for the received prefix and begins sorting through already created tiles (such as pivot tiles 0-5 above) to determine if tiles with the requested base width is already created. If the networking device determines that a pivot tile with the base width of the received prefix already exists, the device determines in operation 506 if any hash values associated with the identified tiles of the requested base width are evenly distributed.

Using the example of Table 1 as an example, all of the created tiles have a base width of /21 and assume the received prefix to be included in a tile also has a base width of /21. The networking device may determine that tiles 0-5 have the same base width (/21) as the requested prefix (/21) and determine the allocated hash values for each identified tiles. In this example, hash function 0 and hash function 2 are allocated twice, with hash function 1 and hash function 3 allocated once. As such, the device may determine that no single hash function is least allocated among the pivot tiles with the same base width as the requested prefix.

If the networking device determines that hash functions for the tiles with the same base width are not evenly distributed, the networking device may select the hash function that is least allocated for the identified pivot tiles and allocate that hash function for the tile to be created in operation 508. Selecting the least allocated hash function to the newly created pivot tile reduces the likelihood that a hash collision occurs for the prefix when being stored in a location of the pivot tile. Alternatively, if the network device determines that the hash function for the tiles with the same base width are evenly distributed, the networking device may select a hash function with the highest hash utilization for the created tile or requested address family in operation 510. For example and using the pivot tiles of Table 1, the networking device determines that hash function 0 and hash function 2 are allocated twice for /21 base widths, with hash function 1 and hash function 3 allocated once. Thus, allocating hash function 1 or hash function 3 for a newly created pivot tile with base width /21 provides the highest hash utilization for the group of pivot tiles. In other words, the networking device may select the hash functions that are least allocated in a way to maximize the hash utilization for the group of pivot tiles with the same base width.

A similar process as described above may be executed for v6 pivots to be included in the pivot tiles. For example, if the newly created tile is to be a left tile allocated from a dynamic pool, then the above operations are performed to select the hash function that is the least allocated amount allocated left tiles. For example, take the circumstance illustrated in Table 1 where the ASIC may include eight pivot tiles. If a v6 pivot (such as a v6 /60 pivot) is received and to be included in pivot tiles, the networking device may create two new pivot tiles for the v6 /60 pivot. In addition, the hash function selected for the left /60 pivot tiles may be determined through the operations described above (i.e., hash function 3 or hash function 1). Thus, application of the method 500 to the allocated pivot tiles may yield the following hash function distribution:

TABLE 2

| Tile ID | Hash Function | # of v4 Prefixes/Base Widths | # of v6 Prefixes/Base Widths |
|---------|---------------|------------------------------|------------------------------|
| 0 | 0 | 130/21 | 0/0 |
| 1 | 1 | 150/21 | 0/0 |
| 2 | 2 | 100/21 | 0/0 |
| 3 | 3 | 90/21 | 0/0 |
| 4 | 2 | 170/21 | 0/0 |
| 5 | 0 | 110/21 | 0/0 |
| 6 | 3 | 0/0 | 210/60 |
| 7 | 1 | 0/0 | 210/60 |

In instances where the newly created tile is a right tile for the v6 prefix, the allocated hash function may from a pre-defined hash mapping table (i.e., left hash function 0 maps to a right hash function of 2).

Returning to the method 500 of FIG. 5, the networking device may determine if the requested tile is to be allocated from a shared pool of pivot tiles in operation 512. If a pivot tile from the shared pool is sought, the networking device may return to operations 506-510 to determine an allocated hash function associated with the received pivot in operation 524. For example, returning to the hash function distribution of Table 1, assume that a pivot of v4 /21 is received. In such a case, the operations above may return hash function 3 or hash function 1 for use in storing the v4 /21 pivot (based on highest hash utilization for the given base width /21). With the returned hash function, the networking device may search the existing pivot tiles for a pivot tile with that same hash function in operation 516. In operation 518, the networking device determines if a pivot tile with the returned hash type and the base width exists. If such a tile exists, the networking device attempts to store the prefix in the selected pivot tile in operation 522. If no pivot tile is found with the returned hash function, the networking device may select a pivot tile from the bottom of the shared pool and use the hash function for that tile for the requested pivot in operation 520.

In some instances, a pivot tile from the shared pool does not have the same base width as the received prefix as determined in operation 512. In this circumstance, the networking device may continue to operation 514 and obtain a unique hash function from a defined formula of the ASIC. Once the unique hash function is returned, the networking device continues to operations 516-522 to select a pivot tile from shared pool of pivot tiles.

The method 500 of FIG. 5 attempts to provide an even distribution of hash functions for a requested base width. It also attempts to create hash functions in a specific order irrespective of the order of prefix insertion into the trie route table. For example, FIG. 6 illustrates the application of the dynamic hash allocation method in a plurality of pivot tiles of a networking device. As shown in the "before" side 602 of the illustration (showing an example hash function distribution without using the method 500 above), pivot tiles with the same base width may be allocated the same hash function (such as pivot tiles with base width v4/v6: 13/60 each being allocated hash function 0). With each pivot tile for the same base width having the same hash function, the possibility of a hash collision occurring within those pivot tiles for newly added pivots increases. After application of the hash function distribution algorithm discussed above (illustrated in the after side 604 of the FIG. 6), pivot tiles with shared base width v4/v6: 13/60 now have varying hash functions (hash function 0, hash function 1, and hash function 2) allocated for the pivot tiles. This reduces the possibility of hash collisions when pivots are added to one or more of these tiles, thereby improving the efficiency of the networking device trie routing table and system.

Figure 7:
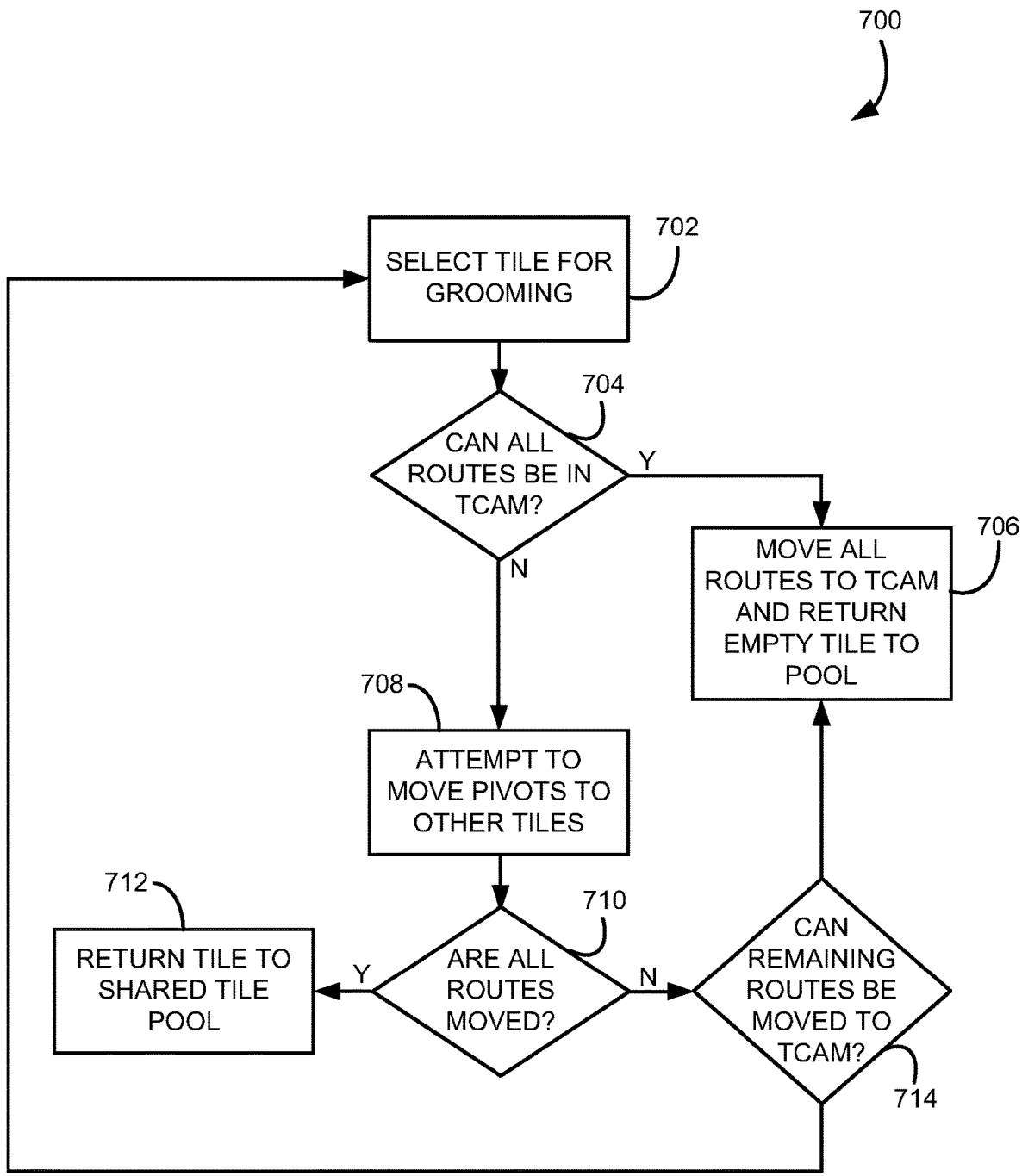
FIG. 7 is a flowchart of a method for regrouping pivot tiles of a network device to free up one or more tiles in a networking device.

The networking device may employ other methods and/or systems to improve the efficiency of the trie routing table and system. For example, FIG. 7 is a flowchart of a method 700 for regrouping pivot tiles of a network device to free up one or more tiles in a networking device for adding more pivots to the pivot tiles. The operations of the method 700 may be performed by the networking device in addition to or separate from the hash function distribution discussed above. Through the method 700, a more efficient use of the available pivot tiles may be achieved in an attempt to maximize the memory use of the ASIC associated with the trie routing table.

In one implementation, the networking device may be configured to begin grooming upon the occurrence of a device event (such as a hash collision, a notification of a maximum pivot tile usage, a scheduled time for grooming, etc.). In another implementation, the networking device may be configured to receive one or more instructions from a device operator to trigger regrooming of the pivot tiles. These instructions may be provided in response to an alarm in the device or from one or more status reports provided to the operator. In still other implementations, pivot tile regrooming may occur periodically as determined by a device operator.

In one particular instance, a prefix/mask of a route is received at the networking device for inclusion in the trie routing table. The prefix may initially be stored in TCAM or similar scratchpad program. However, assume that the TCAM threshold has been met and no tiles exist in the dynamic/shared pool to allocate to the prefix. In such as circumstance, the device may try to free TCAM space by moving routes from the TCAM to one or more pivot tiles. However, if the TCAM threshold is still exceeded, the networking device may trigger the regrooming method 700 of FIG. 7 to try and achieve optimal usage of pivot tiles.

Beginning in operation 702, the networking device may select a tile for grooming or regrouping. In one implementation, the networking device may apply one or more filters to order the pivot tiles in a particular order prior to tile selection. For example, the tiles may be ordered from lower to higher trie utilization or the number of pivot loops of the tile. Regardless, once a tile is selected, the device determines if all of the routes in the selected tile can be moved to TCAM. If all of the routes in the selected pivot tile can be moved to TCAM, the device moves the routes accordingly and returns the tile to the dynamic/shared tile pool in operation 706. This frees the tile for allocation to other prefix/maps as other prefixes are received.

If not all of the routes can be moved to TCAM, the device may attempt to move routes of the selected tile to other allocated tiles in operation 708. For example, consider the pivot tile allocation scenarios illustrated in FIG. 8. Beginning with scenario 802, assume that the routes 1-7 are received at the networking device in the order shown 804. As the routes are allocated to pivot tiles 806 in the order received and based on a mask length (M-3 in particular), all six pivot tiles are allocated with varying base widths. In particular, route 1 has a mask length of /21 such that pivot tile 0 is created with a base width of /18 (M-3). Then route 2 with a mask length of /22 is received at the networking device. Because /22 cannot be included in pivot tile 0 because the base width of tile 0 is more than M-3, a new pivot tile (pivot tile 1) is created for route 2. This process continues through the received routes 804 until pivot tiles 0-5 806 are allocated. However, route 7, when received, cannot be included in any created pivot tile as route 7 has a mask length of /27 (for base widths M-3 to M, i.e., /24 to /27), which does not qualify for any created pivot tile. In one implementation, this inefficiency in the trie route system may trigger the grooming process 700 of FIG. 7.

Consider an alternate inefficiency illustrated in scenario 808 of FIG. 8. In this example, route 1 of mask length /27 is received such that pivot tile 0 is created with base width /24. In this example, routes 2-4 may also be included in pivot tile 0. Route 4 may then be received for which pivot tile 3 is created with base width /20. Routes 5-7 may also be included in pivot tile 1. However, this leaves pivot tiles 2-5 812 empty. In this scenario 808, the pivot tiles 812 are not used efficiently by the system as an efficient system would utilize all pivot tile space. The grooming method 700 discussed above may further improve the efficient use of the pivot tile usage of the system.

A more efficient use of the pivot tiles may include a grooming method such all pivot tiles are utilized while freeing up tiles when new prefixes cannot be included in the existing pivot tiles. For example, consider scenario 814 of FIG. 8. Similar to scenario 802, pivot tiles 1-5 are created and populated as prefixes are received such that routes 1-6 816 are included in pivot tiles. Route 7 of scenario 814 is received with a mask length of /27, which cannot be included in any created tiles, also similar to scenario 802. However, in this example, the pivot tiles may be groomed so that stored pivots may be moved to TCAM or another pivot tile. In particular, received route 1 has a mask length of /21 which led to the creation of pivot tile 0 with a base width /18. However, route 1 may also be stored in pivot tile 1 as the base width of pivot tile 1 (/19) allows for storage of /21 routes (M-2). Thus, route 1 may be moved to pivot tile 1 through the method 700 described herein, which frees up pivot tile 0 to be reallocated with a base width of /24 for storage of received route 7. Through the grooming process described herein, pivot tiles may be used efficiently for the received routes.

Returning to the method 700 of FIG. 7, the networking device first attempts to move all pivots of a tile to TCAM and, if all of the pivots of a selected tile cannot be moved, attempts to move pivots of the selected tile to other allocated tiles in operation 708. Similar to scenario 814 described above, pivots may be placed in any pivot tiles with a base width of M-3, M-2, M-1, or M for the pivot, with preference given in that order. Thus, route 1 of scenario 814 may be relocated to pivot tile 1, pivot tile 2, or pivot tile 3. Moving a pivot from the selected tile to another allocated tile may be done in a manner as described above, such as by calculating a location within the pivot tile from one or more hash functions and storing the pivot in the tile if a hash collision does not occur.

In operation 710, the networking device determines if all of the routes in the selected tile have been moved to other tiles. If all of the routes of the selected pivot tile can be moved to other tiles, the tile may then be considered free and returned to the dynamic/shared pool of tiles in operation 712. If, however, routes remain in the selected tile after moving routes to other tiles, the networking device may determine if the remaining routes from the selected pivot tile can be moved to TCAM in operation 714 and return to operation 706 to move the remaining routes to TCAM. This frees up the tile to be returned to the dynamic/shared pool of tiles. If the tile cannot be freed of all routes, the networking device may return to operation 702 to select the next tile in the sorted list and attempt to free up the next tile for use by the networking device.

In some instances, the above method 700 may not free up a pivot tile for use by other received routes. In such cases, the networking device may keep inserting routes into TCAM until free space is available for a respective address family. Further, the networking device may track the result of the grooming process, including the number of pivots deleted after the failed grooming attempt. The grooming process may not be attempted again on the pivot tiles until a sufficient number of pivots are deleted from the tiles. When a tile is freed, the device may then move the oldest or the route with the highest weight (based on prefix length) from the TCAM to the trie storage structure.

Figure 9A:
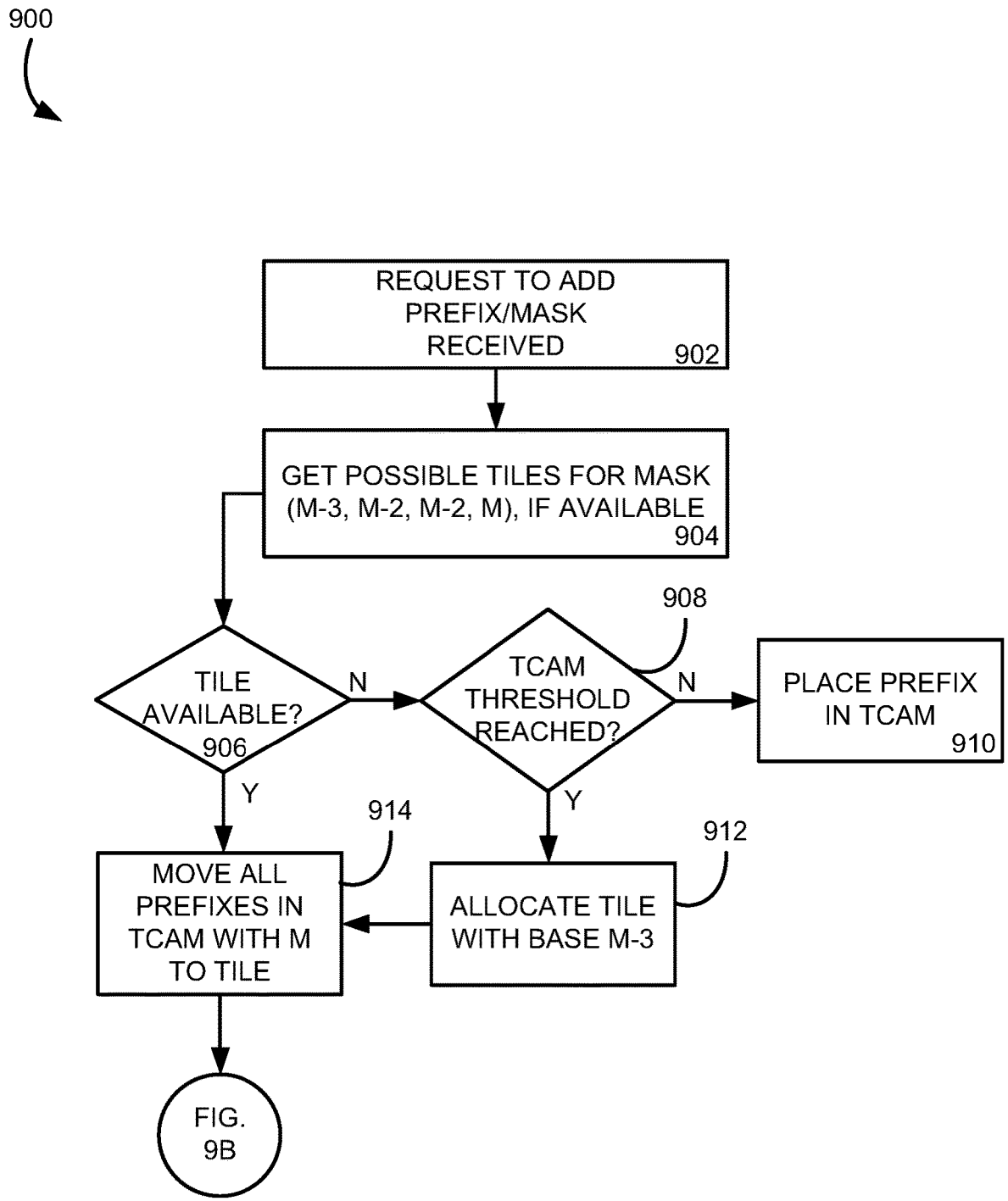
FIGS. 9A and 9B illustrate a flowchart of a method for relocating prefixes when a hash collision occurs within the pivot tile of the networking device.
Figure 9B:
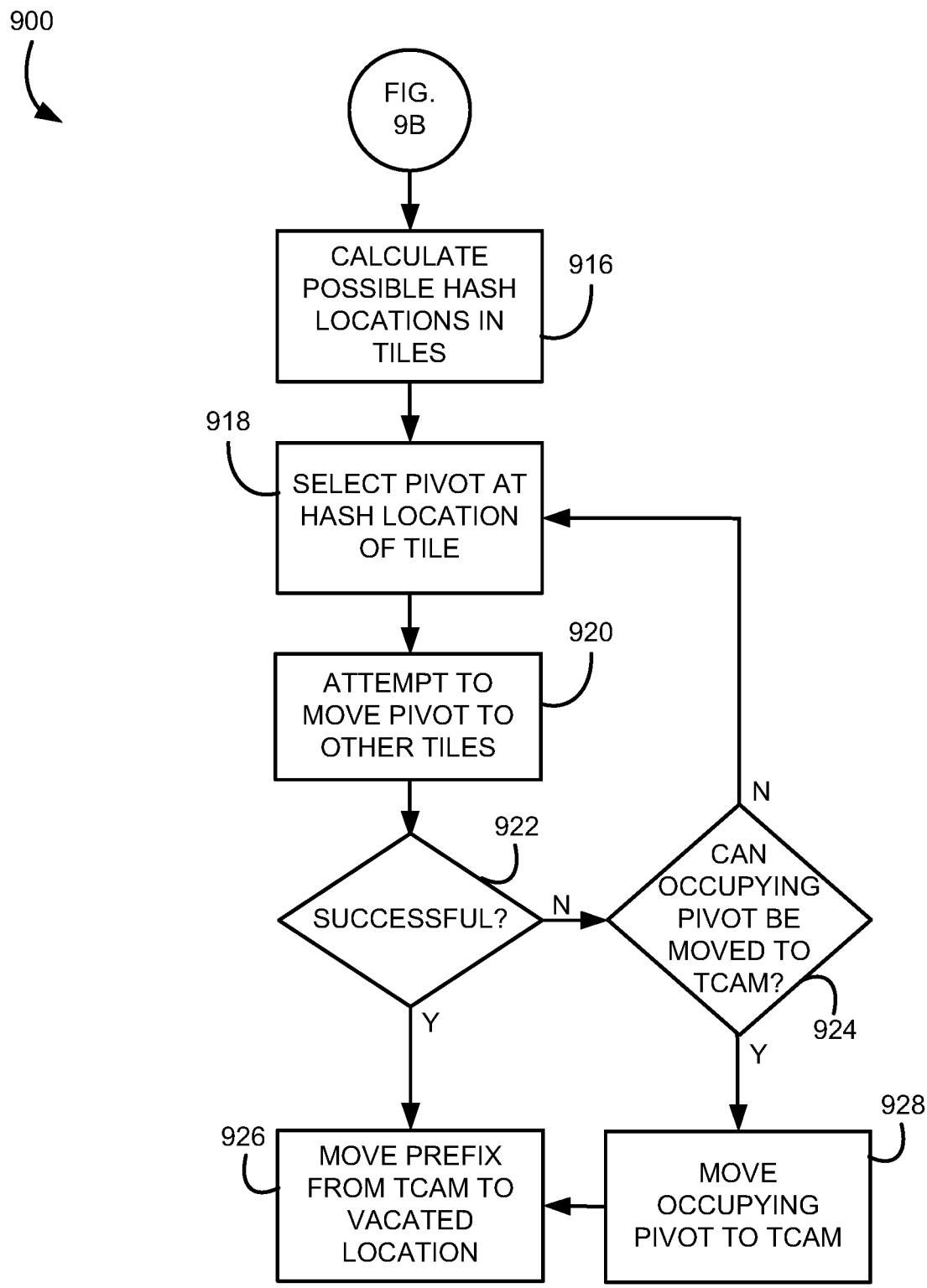

In addition to or as part of the dynamic hash distribution and pivot tile grooming methods discussed above, the networking device may also execute a pivot relocation process to further improve the efficiency of the pivot tile use by the networking device. In particular, FIGS. 9A and 9B illustrate a flowchart of a method 900 for relocating prefixes when a hash collision occurs within the pivot tile of the networking device. Through the method 900, the networking device may attempt to relocate prefixes from a tile to an allocated pivot tile upon the occurrence of a hash collision. In other words, the device may relocate a pivot to another tile so that a received prefix may be stored in a pivot tile at the same location. This makes space for other prefixes primarily from different address families and allows even distribution of pivots within tiles which have a base width in a range of depth of a pivot route.

Consider a circumstance where v4 routes are inserted into pivot tiles before v6 routes. The v4 routes are allocated to the pivot tiles following the rules for prefix insertion such that some v4 routes may have already taken up a location (as determined by the tiles hash function) that may be the same location for a v6 route. For example, when v6 routes are moved from TCAM to the pivot tile, a hash collision may occur with a v4 route programmed into the tile at the same location. However, by relocating the v4 pivot and associated routes to another allocated tile, space may be freed up at the location for the v6 route, aiding in optimizing pivot distribution for a given set of prefixes irrespective of prefix insertion order.

In general, the method 900 of FIGS. 9A and 9B may be triggered or executed by the networking device when routes are moved from TCAM to a pivot tile or when freeing up tiles as part of the pivot grooming process described above with relation to FIG. 7. Further, the pivots may be relocated to tiles associated with the hash function selected through dynamic hash selection process discussed above with relation to FIG. 5. The probability of even pivot distribution within the same base width tile increases when hash functions are evenly distributed. In this manner, the method 900 may be utilized in tandem with other efficiency methods described herein.

Beginning in operation 902 (and similar to method 400 of FIG. 4), the networking device receives a request to add a prefix/mask to a trie routing table and determines the possible, if any, pivot tiles that the prefix can fit into (i.e., pivot tiles with a base width of M-3, M-2, M-1, or M) selected in that order for maximum occupancy in operation 904. If no pivot tiles qualify for the received prefix, the networking device determines if the TCAM threshold for the mask is reached in operation 908 and, if not, the prefix is stored in the TCAM in operation 910. If the TCAM threshold is reached, the networking device may allocate a tile for the prefix (assuming that the dynamic or shared pool of tiles includes a free tile not yet associated to any base width of the prefix address family) with a base width of M-3. In operation 914, the networking device attempts to move all prefixes in the TCAM with mask M into the created tile, potentially repeating the above operations to find space in the pivot tiles for the prefixes moving from the TCAM.

In some instances, a hash collision indicating that no free space is available in the pivot tiles for a given prefix may occur as prefixes are moved from TCAM to the pivot tiles. In such instances, the method 900 may be continued as illustrated in FIG. 9B. In particular, the networking device, upon a hash collision, may calculate possible hash locations for the prefix in the pivot tiles identified above (i.e., pivot tiles with a base width of M-3, M-2, M-1, or M) in operation 916. As mentioned, each pivot tile may have a corresponding hash function that is used to determine locations within the tile for storing a prefix. Therefore, a given prefix may be stored in multiple pivot tiles at the calculated hash locations within the tiles.

With the possible hash locations determined, the networking device may pick a pivot from a tile that is occupying a hash location that is the same as the possible hash location for the prefix moving from the TCAM and attempt to relocate the entire pivot (along with its children) to another pivot tile in operation 920, removing the current pivot tile from the list of possible pivot tiles for relocating the occupying pivot. For example, the pivot may be moved to another pivot tile with base widths M-3, M-2, M-1, or M for the pivot. If the move of the pivot is successful as determined in operation 922, the networking device may move the prefix from the TCAM to the vacated hash location in the pivot tile in operation 926. If the occupying pivot cannot be relocated to another pivot tile, the networking device may determine if the occupying pivot can be moved to TCAM dedicated for the respective address family in operation 924. If the occupying pivot can be moved to TCAM, the networking device does so in operation 928 and moves the prefix to the vacated hash location in the pivot tile in operation 926. If the occupying pivot cannot be moved to TCAM, the network device may return to operation 918 and select another potential hash location in a pivot tile and repeat the resulting operations of the method 900. In some instances, no potential hash location for the moving prefix may be identified. In such cases, the prefix is kept in its original location.

Through the method 900 of FIGS. 9A and 9B, pivots of one or more pivot tiles may be relocated to free up a location for storing other prefixes. This may provide for a maximum occupancy for the pivot tiles of the trie routing table of the networking device. Further, the relocation process may be executed in conjunction with the grooming process described above to free up pivot tiles for re-allocation. Further, because the pivot tiles may be assigned hash functions through a dynamic hash allocation process, the likelihood of hash collisions occurring when inserting a prefix or moving a pivot from one tile to another may be reduced. As such, the processes and systems described herein may improve the operational efficiency of the trie routing table of the networking device.

Figure 10:
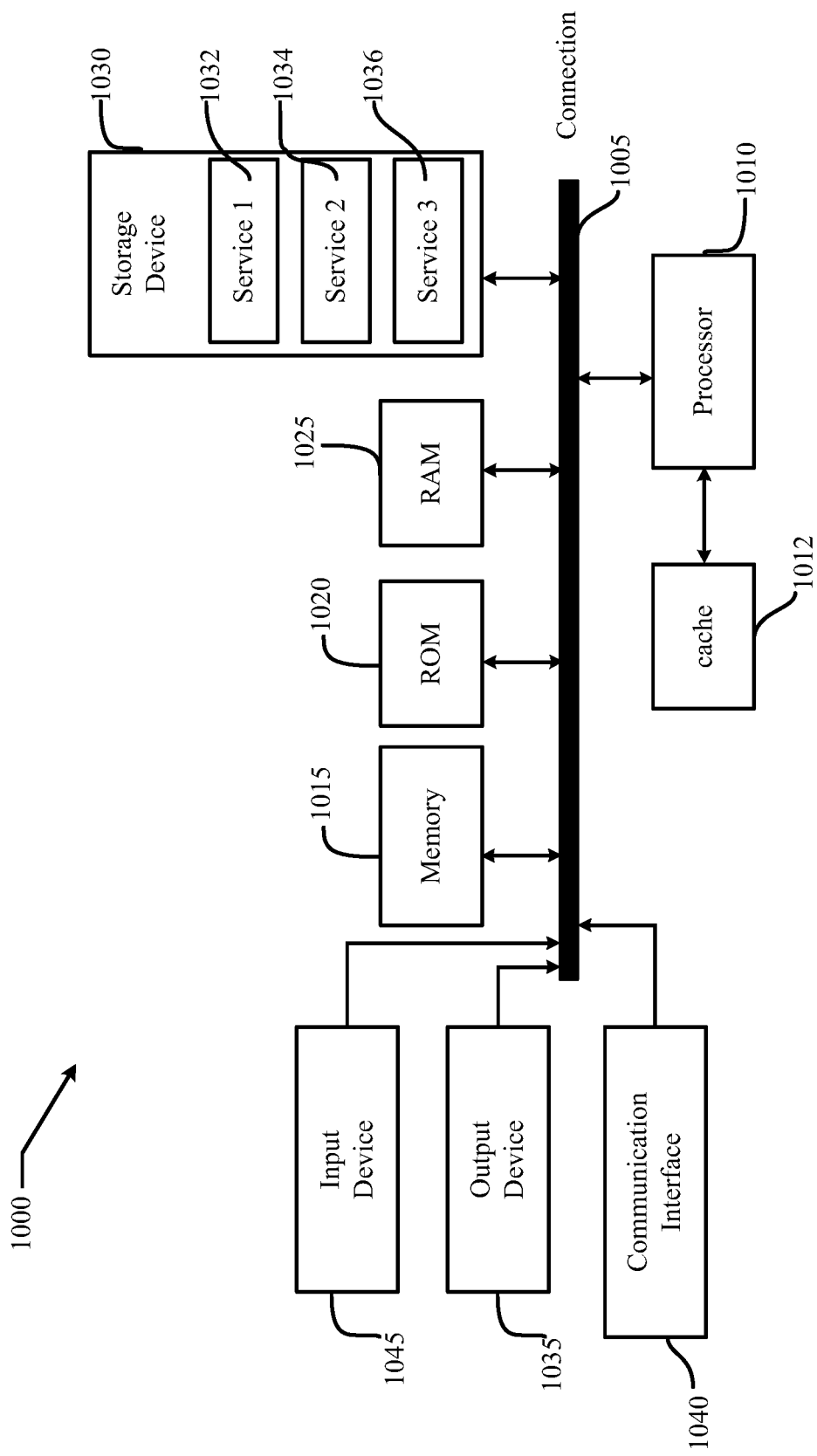
FIG. 10 shows an example system embodiment.

FIG. 10 shows an example of computing system 1000 which may be utilized in conjunction with the herein described systems and methods. In particular, the computing system 1000 is an example of the networking device 102 of the environment 100 described above. In the embodiment shown, the components of the system are in communication with each other using connection 1005. In general, connection 1005 can be a physical connection via a bus, or a direct connection into processor 1010, such as in a chipset architecture. Connection 1005 can also be a virtual connection, networked connection, or logical connection.

In some embodiments, computing system 1000 is a distributed system in which the functions described in this disclosure can be distributed within a datacenter, multiple datacenters, a peer network, etc. In some embodiments, one or more of the described system components represents many such components, each performing some or all of the function for which the component is described. In some embodiments, the components can be physical or virtual devices.

Example system 1000 includes at least one processing unit (CPU or processor) 1010 and connection 1005 that couples various system components, including system memory 1015, such as read only memory (ROM) 1020 and random access memory (RAM) 1025, to processor 1010. Computing system 1000 can include a cache of high-speed memory connected directly with, in close proximity to, or integrated as part of processor 1010.

Processor 1010 can include any general purpose processor and a hardware service or software service, such as services 1032, 1034, and 1036 stored in storage device 1030, configured to control processor 1010 as well as a special-purpose processor where software instructions are incorporated into the actual processor design. Processor 1010 may essentially be a completely self-contained computing system, containing multiple cores or processors, a bus, memory controller, cache, etc. A multi-core processor may be symmetric or asymmetric.

To enable user interaction, computing system 1000 includes an input device 1045, which can represent any number of input mechanisms, such as a microphone for speech, a touch-sensitive screen for gesture or graphical input, keyboard, mouse, motion input, speech, etc. Computing system 1000 can also include output device 1035, which can be one or more of a number of output mechanisms known to those of skill in the art. In some instances, multimodal systems can enable a user to provide multiple types of input/output to communicate with computing system 1000. Computing system 1000 can include communications interface 1040, which can generally govern and manage the user input and system output. There is no restriction on operating on any particular hardware arrangement and therefore the basic features here may easily be substituted for improved hardware or firmware arrangements as they are developed.

Storage device 1030 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read only memory (ROM), and/or some combination of these devices.

The storage device 1030 can include software services, servers, services, etc., that when the code that defines such software is executed by the processor 1010, it causes the system to perform a function. In some embodiments, a hardware service that performs a particular function can include the software component stored in a computer-readable medium in connection with the necessary hardware components, such as processor 1010, connection 1005, output device 1035, etc., to carry out the function.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a portable device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The invention claimed is:

1. A method comprising:
   receiving a request to add a prefix to a routing table;
   in response to the request, determining whether there are pivot tiles available to add the prefix;
   in response to there not being a pivot tile available, determining if a (Ternary Content-Addressable Memory (TCAM) threshold is reached;
   in response to the TCAM threshold being reach, allocating a new pivot tile for the prefix; and
   in response to the new pivot tile being allocated, moving prefixes to the new pivot tile.

2. The method of claim 1, wherein pivot tiles that the prefix can be added have a base width of a mask length, the mask length-3, the mask length-2, the mask length-1.

3. The method of claim 1, wherein the pivot tile is selected for maximum occupancy.

4. The method of claim 1, further comprising:
   in response to the TCAM threshold not being reach, storing the prefix in the TCAM.

5. The method of claim 1, wherein the new pivot tile has a base width of mask length-3.

6. The method of claim 1, further comprising:
   calculating possible hash locations for the prefix in the determined pivot tiles;
   selecting a pivot tile that has a same hash location as possible hash location for the prefix;
   relocating the selected pivot tile to another pivot tile; and
   in response to the relocation being successful, moving the prefix from TCAM to the pivot tile.

7. The method of claim 1, further comprising:
   calculating possible hash locations for the prefix in the determined pivot tiles;
   selecting a pivot tile that has a same hash location as possible hash location for the prefix;
   relocating the selected pivot tile to another pivot tile;
   in response to the relocation not being successful, determining the selected pivot tile can be moved to TCAM; and
   moving the selected pivot tile to TCAM.

8. The method of claim 1, further comprising:
   calculating possible hash locations for the prefix in the determined pivot tiles;
   selecting a pivot tile that has a same hash location as possible hash location for the prefix;
   relocating the selected pivot tile to another pivot tile;
   in response to the relocation not being successful, determining the selected pivot tile cannot be moved to TCAM; and
   selecting a different pivot tile that has a same hash location as the possible hash location for the prefix.

9. The method of claim 1, further comprising in response to the TCAM threshold being reached:

determining if the new pivot tile is needed for the prefix;
in response to the new pivot tile being needed, determining if hash functions associated with the pivot tiles are evenly distributed; and
in response to the hash functions not being evenly distributed, using a hash function that is least allocated.

10. The method of claim 1, further comprising in response to the TCAM threshold being reached:
determining if the new pivot tile is needed for the prefix;
in response to the new pivot tile being needed, determining if hash functions associated with the pivot tiles are evenly distributed; and
in response to the hash functions being evenly distributed, using the hash function with a highest utilization.

11. A system comprising:
at least one processor;
at least one memory storing instructions, which when executed by the at least one processor, causes the at least one processor to:
receive a request to add a prefix to a routing table;
in response to the request, determine whether there are pivot tiles available to add the prefix;
in response to there not being a pivot tile available, determine if a (Ternary Content-Addressable Memory (TCAM) threshold is reached;
in response to the TCAM threshold being reach, allocate a new pivot tile for the prefix; and
in response to the new pivot tile being allocated, move prefixes to the new pivot tile.

12. The system of claim 11, further comprising instructions, which when executed by the at least one processor, causes the at least one processor to:
in response to the TCAM threshold not being reach, store the prefix in the TCAM.

13. The system of claim 11, further comprising instructions, which when executed by the at least one processor, causes the at least one processor to:
calculate possible hash locations for the prefix in the determined pivot tiles;
select a pivot tile that has a same hash location as possible hash location for the prefix;
relocate the selected pivot tile to another pivot tile; and
in response to the relocation being successful, move the prefix from TCAM to the pivot tile.

14. The system of claim 11, further comprising instructions, which when executed by the at least one processor, causes the at least one processor to:
calculate possible hash locations for the prefix in the determined pivot tiles;
select a pivot tile that has a same hash location as possible hash location for the prefix;
relocate the selected pivot tile to another pivot tile;
in response to the relocation not being successful, determine the selected pivot tile can be moved to TCAM; and
move the selected pivot tile to TCAM.

15. The system of claim 11, further comprising instructions, which when executed by the at least one processor, causes the at least one processor to:
calculate possible hash locations for the prefix in the determined pivot tiles;
select a pivot tile that has a same hash location as possible hash location for the prefix;
relocate the selected pivot tile to another pivot tile;
in response to the relocation not being successful, determine the selected pivot tile cannot be moved to TCAM; and
select a different pivot tile that has a same hash location as the possible hash location for the prefix.

16. The system of claim 11, further comprising instructions, which when executed by the at least one processor, causes the at least one processor to:
in response to the TCAM threshold being reached:
determine if the new pivot tile is needed for the prefix;
in response to the new pivot tile being needed, determine if hash functions associated with the pivot tiles are evenly distributed; and
in response to the hash functions not being evenly distributed, use a hash function that is least allocated.

17. The system of claim 11, further comprising in response to the TCAM threshold being reached:
determine if the new pivot tile is needed for the prefix;
in response to the new pivot tile being needed, determine if hash functions associated with the pivot tiles are evenly distributed; and
in response to the hash functions being evenly distributed, use the hash function with a highest utilization.

18. At least one non-transitory computer-readable medium storing instructions, which when executed by the at least one processor, causes the at least one processor to:
receive a request to add a prefix to a routing table;
in response to the request, determine whether there are pivot tiles available to add the prefix;
in response to there not being a pivot tile available, determine if a (Ternary Content-Addressable Memory (TCAM) threshold is reached;
in response to the TCAM threshold being reach, allocate a new pivot tile for the prefix; and
in response to the new pivot tile being allocated, move prefixes to the new pivot tile.

19. The at least one non-transitory computer-readable medium storing instructions of claim 18, further comprising instructions, which when executed by the at least one processor, causes the at least one processor to:
in response to the TCAM threshold being reached:
determine if the new pivot tile is needed for the prefix;
in response to the new pivot tile being needed, determine if hash functions associated with the pivot tiles are evenly distributed; and
in response to the hash functions not being evenly distributed, use a hash function that is least allocated.

20. The least one non-transitory computer-readable medium storing instructions of claim 18, further comprising in response to the TCAM threshold being reached:
determine if the new pivot tile is needed for the prefix;
in response to the new pivot tile being needed, determine if hash functions associated with the pivot tiles are evenly distributed; and
in response to the hash functions being evenly distributed, use the hash function with a highest utilization.

\* \* \* \* \*